US009117335B2

(12) United States Patent
Crowder, Jr. et al.

(10) Patent No.: US 9,117,335 B2
(45) Date of Patent: Aug. 25, 2015

(54) GAMING MACHINE HAVING A MOLDED CURVED DISPLAY

(71) Applicant: BALLY GAMING, INC., Las Vegas, NV (US)

(72) Inventors: Robert W. Crowder, Jr., Las Vegas, NV (US); John R. Vallejo, Henderson, NV (US); Vernon H. Bernard, Henderson, NV (US); Karl E. Wudtke, Las Vegas, NV (US); Frank R. Anderson, Las Vegas, NV (US); Lawrence C. McAllister, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

(21) Appl. No.: 14/271,215

(22) Filed: May 6, 2014

(65) Prior Publication Data

US 2014/0243070 A1 Aug. 28, 2014

Related U.S. Application Data

(60) Continuation of application No. 13/212,117, filed on Aug. 17, 2011, now Pat. No. 8,821,282, which is a continuation of application No. 12/463,940, filed on May 11, 2009, now Pat. No. 8,012,021, which is a continuation-in-part of application No. 12/271,781, filed on Nov. 14, 2008, now Pat. No. 8,137,185, which is a continuation-in-part of application No. 12/271,802, filed on Nov. 14, 2008, now Pat. No. 8,272,957, which is a continuation-in-part of application No. 11/209,895, filed on Aug. 23, 2005, now Pat. No. 7,479,065, which is a division of application No. 09/690,289, filed on Oct. 16, 2000, now Pat. No. 6,942,571.

(51) Int. Cl.
*G06F 17/00* (2006.01)
*G07F 17/32* (2006.01)

(52) U.S. Cl.
CPC ........ *G07F 17/3213* (2013.01); *G07F 17/3202* (2013.01); *G07F 17/3211* (2013.01)

(58) Field of Classification Search
USPC ...................... 463/20, 30, 31, 34, 46; 312/7.2
See application file for complete search history.

(56) References Cited

U.S. PATENT DOCUMENTS

| | | | |
|---|---|---|---|
| 4,353,552 | A | 10/1982 | Pepper, Jr. |
| 4,517,558 | A | 5/1985 | Davids |
| 5,198,976 | A | 3/1993 | Form et al. |
| 5,342,047 | A | 8/1994 | Heidel et al. |
| 5,376,946 | A | 12/1994 | Mikan |
| 5,511,784 | A | 4/1996 | Furry et al. |
| 5,611,535 | A | 3/1997 | Tiberio |

(Continued)

FOREIGN PATENT DOCUMENTS

| | | | |
|---|---|---|---|
| JP | 06-254209 | A | 9/1994 |
| JP | 07-59908 | A | 3/1995 |

*Primary Examiner* — Ronald Laneau

(74) *Attorney, Agent, or Firm* — Brooke W. Quist; Marvin A. Hein; Philip J. Anderson

(57) ABSTRACT

Gaming machines having video depictions of one or more mechanical reels on a curved display are disclosed herein. In one embodiment, the gaming machine includes a liquid crystal display having an opening in which the curved transparent material extends through the opening of the opening of the liquid crystal display.

9 Claims, 18 Drawing Sheets

(56) References Cited

U.S. PATENT DOCUMENTS

| | | | | |
|---|---|---|---|---|
| 5,697,843 | A | 12/1997 | Manship et al. | |
| 5,704,835 | A | 1/1998 | Dietz, II | |
| 5,766,074 | A | 6/1998 | Cannon et al. | |
| 5,769,716 | A | 6/1998 | Saffari et al. | |
| 5,770,533 | A | 6/1998 | Franchi | |
| 5,795,430 | A | 8/1998 | Beeteson et al. | |
| 5,796,389 | A | 8/1998 | Bertram et al. | |
| 5,803,453 | A | 9/1998 | Stephan et al. | |
| 5,886,687 | A | 3/1999 | Gibson | |
| 5,951,397 | A | 9/1999 | Dickinson | |
| 5,958,020 | A | 9/1999 | Evoy et al. | |
| 6,004,208 | A | 12/1999 | Takemoto et al. | |
| 6,015,346 | A | 1/2000 | Bennett | |
| 6,068,552 | A | 5/2000 | Walker et al. | |
| 6,120,378 | A | 9/2000 | Moody et al. | |
| 6,134,044 | A | 10/2000 | Gdovin et al. | |
| 6,135,884 | A | 10/2000 | Hedrick et al. | |
| 6,165,070 | A | 12/2000 | Nolte et al. | |
| 6,201,532 | B1 | 3/2001 | Tode et al. | |
| 6,409,602 | B1 | 6/2002 | Wiltshire et al. | |
| 6,475,087 | B1 | 11/2002 | Cole | |
| 6,599,192 | B1 | 7/2003 | Baerlocher et al. | |
| 6,937,298 | B2 | 8/2005 | Okada | |
| 6,942,571 | B1 | 9/2005 | McAllister et al. | |
| 7,166,029 | B2 | 1/2007 | Enzminger | |
| 7,510,475 | B2 | 3/2009 | Loose et al. | |
| 7,654,899 | B2 | 2/2010 | Durham et al. | |
| 7,744,460 | B2 | 6/2010 | Walker et al. | |
| 7,951,001 | B2 | 5/2011 | Wells | |
| 7,971,879 | B2 | 7/2011 | Loose et al. | |
| 8,012,021 | B2 | 9/2011 | Crowder, Jr. et al. | |
| 8,016,669 | B2 | 9/2011 | Okada | |
| 8,137,185 | B2 | 3/2012 | Crowder, Jr. et al. | |
| 8,272,957 | B2 | 9/2012 | Crowder, Jr. et al. | |
| 8,425,318 | B2 | 4/2013 | Canterbury et al. | |
| 8,888,591 | B2 * | 11/2014 | dos Santos et al. | 463/31 |
| 2001/0013681 | A1 | 8/2001 | Bruzzese et al. | |
| 2002/0142832 | A1 | 10/2002 | Loose et al. | |
| 2002/0175466 | A1 | 11/2002 | Loose et al. | |
| 2003/0060269 | A1 | 3/2003 | Paulsen et al. | |
| 2003/0087690 | A1 | 5/2003 | Loose et al. | |
| 2003/0130028 | A1 | 7/2003 | Aida et al. | |
| 2003/0157980 | A1 | 8/2003 | Loose et al. | |
| 2004/0029639 | A1 | 2/2004 | Regan | |
| 2004/0053661 | A1 | 3/2004 | Jones et al. | |
| 2004/0102244 | A1 | 5/2004 | Kryuchkov et al. | |
| 2004/0166926 | A1 | 8/2004 | Adachi et al. | |
| 2004/0266510 | A1 | 12/2004 | Kojima | |
| 2005/0037843 | A1 | 2/2005 | Wells et al. | |
| 2005/0192090 | A1 | 9/2005 | Muir et al. | |
| 2006/0142080 | A1 * | 6/2006 | Enzminger | 463/30 |
| 2006/0199638 | A1 | 9/2006 | Walker et al. | |
| 2007/0004513 | A1 | 1/2007 | Wells et al. | |
| 2008/0004104 | A1 | 1/2008 | Durham et al. | |
| 2008/0096655 | A1 * | 4/2008 | Rasmussen et al. | 463/31 |
| 2008/0102916 | A1 | 5/2008 | Kovacs et al. | |
| 2008/0108422 | A1 | 5/2008 | Hedrick et al. | |
| 2008/0113747 | A1 * | 5/2008 | Williams et al. | 463/20 |
| 2008/0113749 | A1 | 5/2008 | Williams et al. | |
| 2008/0119283 | A1 | 5/2008 | Baerlocher | |
| 2008/0165150 | A1 | 7/2008 | Kwon | |
| 2008/0200233 | A1 * | 8/2008 | Aida | 463/20 |
| 2009/0069069 | A1 | 3/2009 | Crowder, Jr. et al. | |
| 2009/0075721 | A1 | 3/2009 | Pacey et al. | |
| 2009/0093300 | A1 | 4/2009 | Lutnick et al. | |
| 2009/0181755 | A1 | 7/2009 | Gagner et al. | |
| 2009/0258697 | A1 | 10/2009 | Kelly et al. | |
| 2010/0048288 | A1 | 2/2010 | Canterbury et al. | |
| 2010/0248808 | A1 | 9/2010 | Barker et al. | |

* cited by examiner

FIG. 3
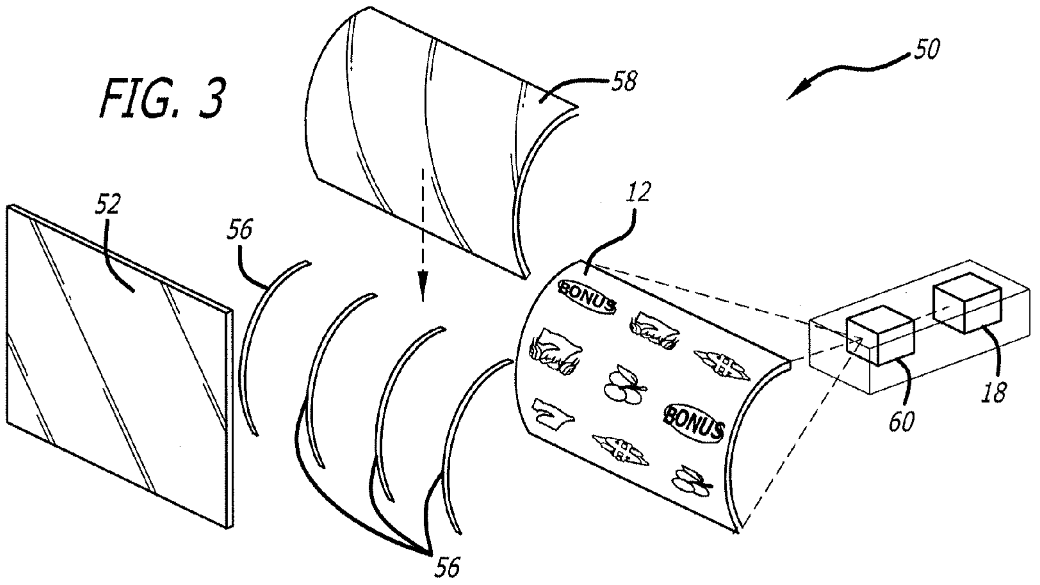
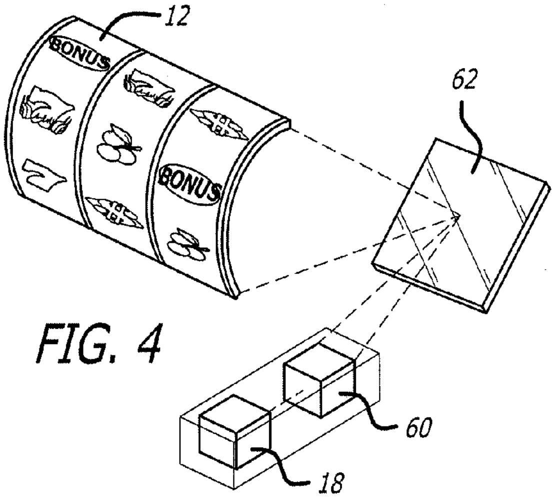
FIG. 4
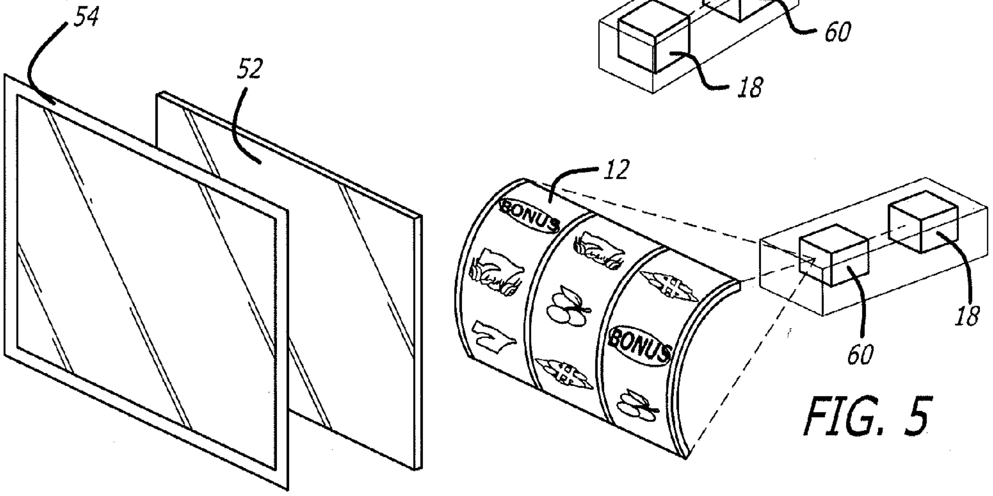
FIG. 5

GAMING MACHINE HAVING A MOLDED CURVED DISPLAY

CROSS-REFERENCE TO RELATED APPLICATIONS

This application is a continuation of U.S. patent application Ser. No. 13/212,117 filed Aug. 17, 2011, which is a continuation of U.S. patent application Ser. No. 12/463,940, filed May 11, 2009, now U.S. Pat. No. 8,012,021, issued Sep. 6, 2011, which is a continuation-in-part of U.S. patent application Ser. No. 12/271,781, now U.S. Pat. No. 8,137,185, issued Mar. 20, 2012, and Ser. No. 12/271,802, now U.S. Pat. No. 8,272,957, issued Sep. 25, 2012, both of which were filed Nov. 14, 2008, and both of which are continuation-in-parts of U.S. patent application Ser. No. 11/209,895, filed Aug. 23, 2005, now U.S. Pat. No. 7,479,065, issued Jan. 20, 2009, which is a divisional of U.S. patent application Ser. No. 09/690,289, filed Oct. 16, 2000, now U.S. Pat. No. 6,942,571, all of which are hereby incorporated by reference.

This application is also related to U.S. patent application Ser. No. 12/464,046, filed on May 11, 2009, entitled Gaming Machine Having A Curved Display With A Video Switcher And Touch Screen System, which is hereby incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This description relates to gaming systems and machines having a curved display.

BACKGROUND

Gaming machines have been developed having various features to capture and maintain player interest. Some features are directed to increasing or providing the player with the opportunity to win larger sums of money. For example, gaming machines may include second chance games that provide a player with additional opportunities to obtain a winning outcome. Alternatively, gaming machines may be tied into progressive gaming systems that award large progressive jackpots.

In addition to providing players with more opportunities to obtain a winning outcome or win a large sum of money, gaming machines have increased the number of features and grown in sophistication in order to increase player participation or interest in a game. For example, the mechanical reels of traditional gaming machines have been replaced with video depictions of spinning reels. These video gaming machines provide a richer gaming experience for players by including graphics or animation as part of the game. However, overly complex video displays on a gaming machine may turn off player participation because players become frustrated with the game or are unwilling to learn or decipher all the information provided on the video display. Accordingly, there is a continuing need for slot machine variants that provide a player with enhanced excitement without departing from the original slot machine gaming concept.

SUMMARY

Briefly, and in general terms, various embodiments are directed to gaming machines having video depictions of one or more mechanical reels projected onto a curved display. In one embodiment, the gaming machine includes a curved transparent material having an outer surface, an inner surface, and a radius of curvature similar to a mechanical reel. The gaming machine also includes a projector for projecting video images of one or more reels onto the inner surface of the curved transparent material. The gaming machine also has a liquid crystal display having an opening in which the curved transparent material extends through the opening of the liquid crystal display.

In another embodiment, the gaming machine includes a piece of curved transparent material having an outer surface, an inner surface, and a radius of curvature similar to a mechanical reel. The gaming machine also includes a projector for projecting video images of one or more reels onto the curved transparent material. Additionally, a front-coated mirror is positioned between the projector and the curved transparent material in which the front-coated mirror reflects the video images from the projector onto the curved transparent material. In this embodiment, the gaming machine also has a lens positioned between the projector and the front-coated mirror.

In yet another embodiment, the gaming machine includes a piece of curved material approximating a radius of curvature similar to a mechanical reel. The curved material is transparent and has an outer surface and an inner surface. The gaming machine also includes a light emitting diode projector for projecting images of one or more reels onto the inner surface of the curved material. The gaming machine further has a video display screen having an opening, in which the curved material extends through the opening of the opening of the video display screen. The gaming machine also includes a secondary display positioned above the curved material in which the light emitting diode projector projects one or more video images onto the secondary display.

In another embodiment, the gaming machine includes a curved transparent material having an outer surface, an inner surface, and a radius of curvature similar to a mechanical reel. The curved transparent material further has a glossy finish on the outer surface of the curved transparent material to provide a reflective surface. The gaming machine also includes a flat transparent material around the perimeter of the curved transparent material, wherein the flat transparent material presents game information. The gaming machine is also provided with a light emitting diode projector that projects video images of one or more reels onto the inner surface of the curved transparent material as well as game information onto the flat transparent material.

In yet another embodiment, a gaming machine includes a gaming cabinet defining an interior space. The gaming machine also includes a projection enclosure positioned within the interior space of the gaming cabinet. The projection enclosure has a curved transparent material provided on a front surface of the projection enclosure. Within the enclosure, a first mirror is spaced apart from the light emitting diode projector, and a second mirror is positioned in the back of the enclosure. The video images from the light emitting diode projector are reflected off the first and second mirrors onto the curved transparent material. The gaming machine further includes a touch screen positioned in front of the curved transparent material, wherein the touch screen produces touch data when activated.

Another embodiment is directed to a self-contained projection system for a gaming machine. The self-contained projection system includes an enclosure having one or more interior walls with a light absorbing coating applied thereon. A curved material is coupled to the front of the enclosure. The curved material is generally transparent and has an outer surface and an inner surface. The curved material also approximates the radius of curvature of a mechanical reel. The self-contained projection system also includes a light emitting diode projector fixed within the enclosure. The light emitting diode projector presents images of one or more reels on the curved material. Within the enclosure, one or more mirrors are positioned between the piece of curved material and the light emitting diode projector, wherein the mirrors reflecting the image of the one or more reels on the curved material.

In addition to gaming machines, various embodiments of a gaming system having touch panels as user control devices are disclosed herein. According to one embodiment, the gaming system includes a curved display system for displaying a game. The curved display system has a curved material having an outer surface, an inner surface, and a radius of curvature similar to a mechanical reel. The curved display system also includes a digital light projection device for projecting images of one or more reels onto the curved material. The gaming system also includes a touch screen system positioned in front of the curved material. The touch screen system includes a touch sensor assembly having a substantially transparent touch panel that produces touch data when activated, a touch panel controller for controlling and interpreting the touch data, and touch panel software for controlling and interpreting touch data.

In another embodiment, the gaming system includes a curved display system for displaying a game. The curved display system has a curved material having an outer surface, an inner surface, and a radius of curvature similar to a mechanical reel. The curved display system also includes a digital light projection device for projecting images of one or more reel strips onto the curved material. The gaming system also includes a touch screen system positioned in front of the curved material. The touch screen system has a touch sensor assembly having a substantially transparent touch panel that produces touch data when activated, a touch panel controller for controlling and interpreting the touch data, and touch panel software for controlling and interpreting touch data. The touch panel is configured to select one or more pay lines for the game.

In yet another embodiment, the gaming system includes a curved display system for displaying a game. The curved display system has a curved material having an outer surface, an inner surface, and a radius of curvature similar to a mechanical reel. The curved display system also includes a digital light projection device for projecting images of one or more reel strips onto the curved material. The gaming system also includes a touch screen system positioned in front of the curved material. The touch screen system has a touch sensor assembly having a substantially transparent touch panel that produces touch data when activated, a touch panel controller for controlling and interpreting the touch data, and touch panel software for controlling and interpreting touch data. The touch panel is configured to add reel strips to the game, remove reel strips from the game, add game indicia to the reel strips, or remove game indicial from the reel strips.

Other features and advantages will become apparent from the following detailed description, taken in conjunction with the accompanying drawings, which illustrate by way of example, the features of the various embodiments.

BRIEF DESCRIPTION OF THE DRAWINGS

FIG. 3 is an exploded view of the curved display system of FIG. 1.

FIG. 4 is an exploded view of another embodiment of a curved display system.

FIG. 5 is an exploded view of one embodiment of a curved display system having a touch panel system.

DETAILED DESCRIPTION

Various embodiments are directed to gaming machines having video depictions of one or more mechanical reels projected onto a curved display. According to one embodiment, a digital light processing (DLP) projector that presents video images of one or more reels on the curved display. In one embodiment, the curved display is shaped to simulate the look of mechanical reels. Additionally, the high resolution of the DLP projector presents video images that gives a player the impression that the combination of the curved display and the video images are physical, mechanical reel strips.

In other embodiments, shrouds (either physical or video-depictions of the shrouds) may be placed between the video depiction of the reels to provide a more realistic impression of mechanical reels. Optionally, the gaming machines may include other audio and visual features to enhance the perception that the video images and curved display are mechanical reels. For example, the video images may shudder to simulate the torque of stopping the spinning mechanical reels. Alternatively, the video images may have visual imperfections to simulate mechanical reels. Furthermore, audio sound effects may be coordinated with the movement and stopping of the reels to further simulate a gaming machine having mechanical reels.

Because the gaming machine is video-based, the gaming machine also maintains the flexibility of a video gaming machine. For example, the DLP projector may present pay lines directly on and/or around the symbols that comprise a winning outcome. The pay lines may be animated or otherwise highlight the winning combination of symbols. Optionally, the winning symbols may be animated on the "virtual" reel strip. For example, the symbols that form a winning pay line may interact with one another or the symbols may be emphasized by expanding the size of the symbol. Alternatively, a short animated movie may be presented at one or more of the game indicia on a winning pay line. In another embodiment, the images of the game indicia on the "virtual" strips may be altered so that a "wild" symbol morphs into the game indicia that forms a winning combination. For example, a "wild" symbol may morph into a "7" to complete a winning combination of "7-7-7." In yet another embodiment, the reel strip color may be altered in response to a particular game outcome or trigger for a bonus game.

Figure 1:
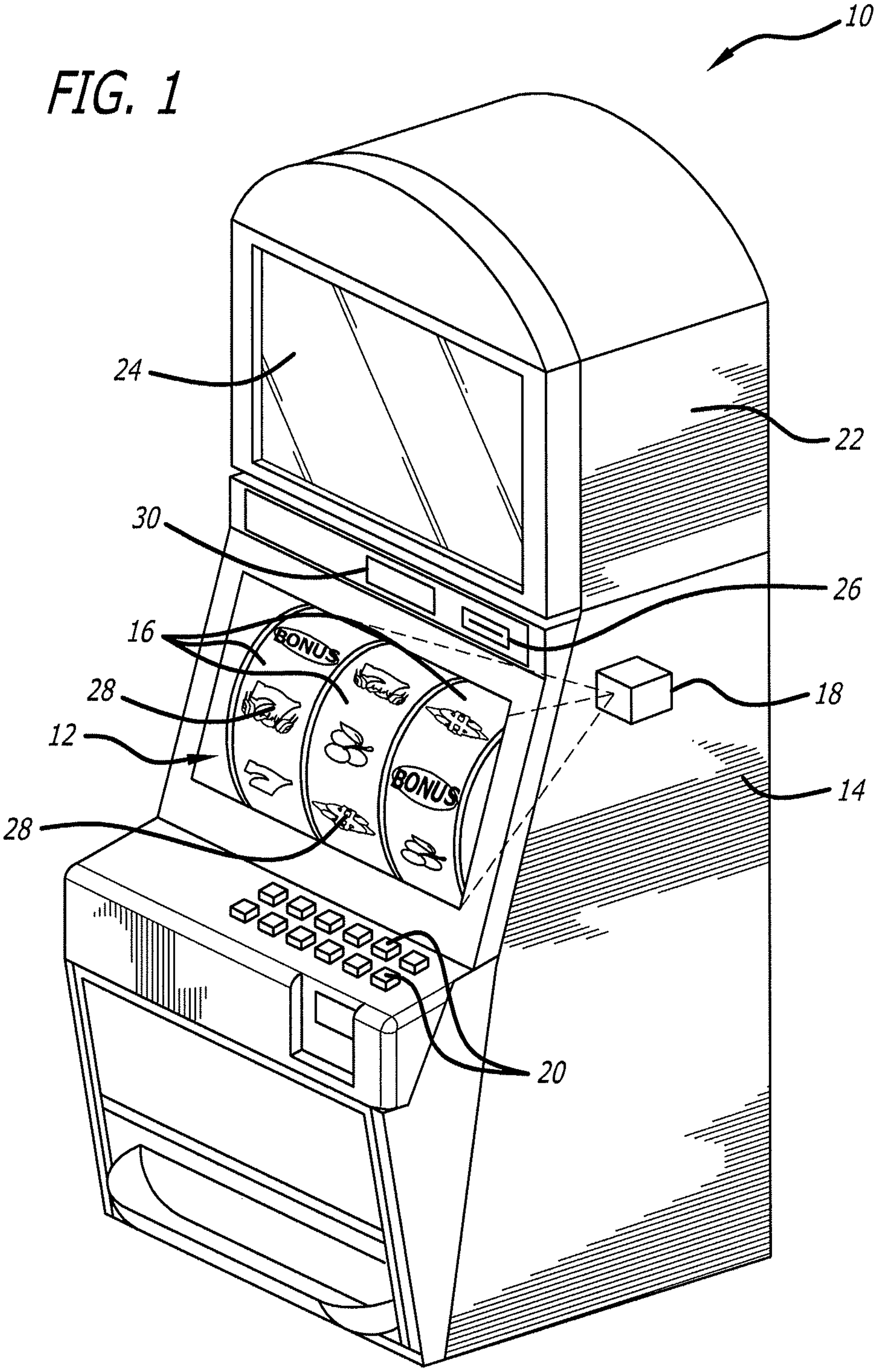
FIG. 1 is a perspective view of one embodiment of a gaming machine having a curved display.

Referring now to the drawings, wherein like reference numerals denote like or corresponding parts throughout the drawings and, more particularly to FIGS. 1-18, there are shown various embodiments of a gaming machine having a curved display system. More specifically, as shown in FIG. 1, the gaming machine 10 includes a curved material 12 positioned within the main gaming cabinet 14. A video image 16 of one or more mechanical reels is projected onto the curved material 12 by a digital light projection (DLP) device 18 or other light projection system. In one embodiment, the DLP device 18 is a Samsung P400 LED projector. As shown in FIG. 1, the video image 16 depicts an image of three mechanical reels. In another embodiment, the video image 16 may depict video images of five mechanical reels.

It is contemplated that the video image 16 may present any number of reels ranging from one reel to five or more reels. In another embodiment, the gaming machine may include a combination of one or more mechanical reels and video images of one or more reels presented on a curved display. The DLP device may project one or more video images 16 onto the curved display 12. Accordingly, it is possible to present a game that is a combination of mechanical reels as well as video reels. The video reels may be part of the primary game or may be presented as a portion of a secondary game.

As shown in FIG. 1, the video image 16 of each of reels also presents one or more game indicia 28. In one embodiment, the video image of each reel includes three game indicia. In another embodiment, the video image of each reel includes four game indicia, thereby increasing the number of paylines available for wagering. Optionally, the game indicia 28 may be animated when the indicia 28 is a component of a winning outcome on an active pay line. Alternatively, the game indicia 28 morphs into a symbol that forms a winning outcome. For example, a "wild" symbol will morph (i.e., change into) a symbol that will form a winning outcome. Accordingly, for a winning outcome of "cherry-wild-cherry," the "wild" symbol will change into a "cherry" symbol.

Figure 2:
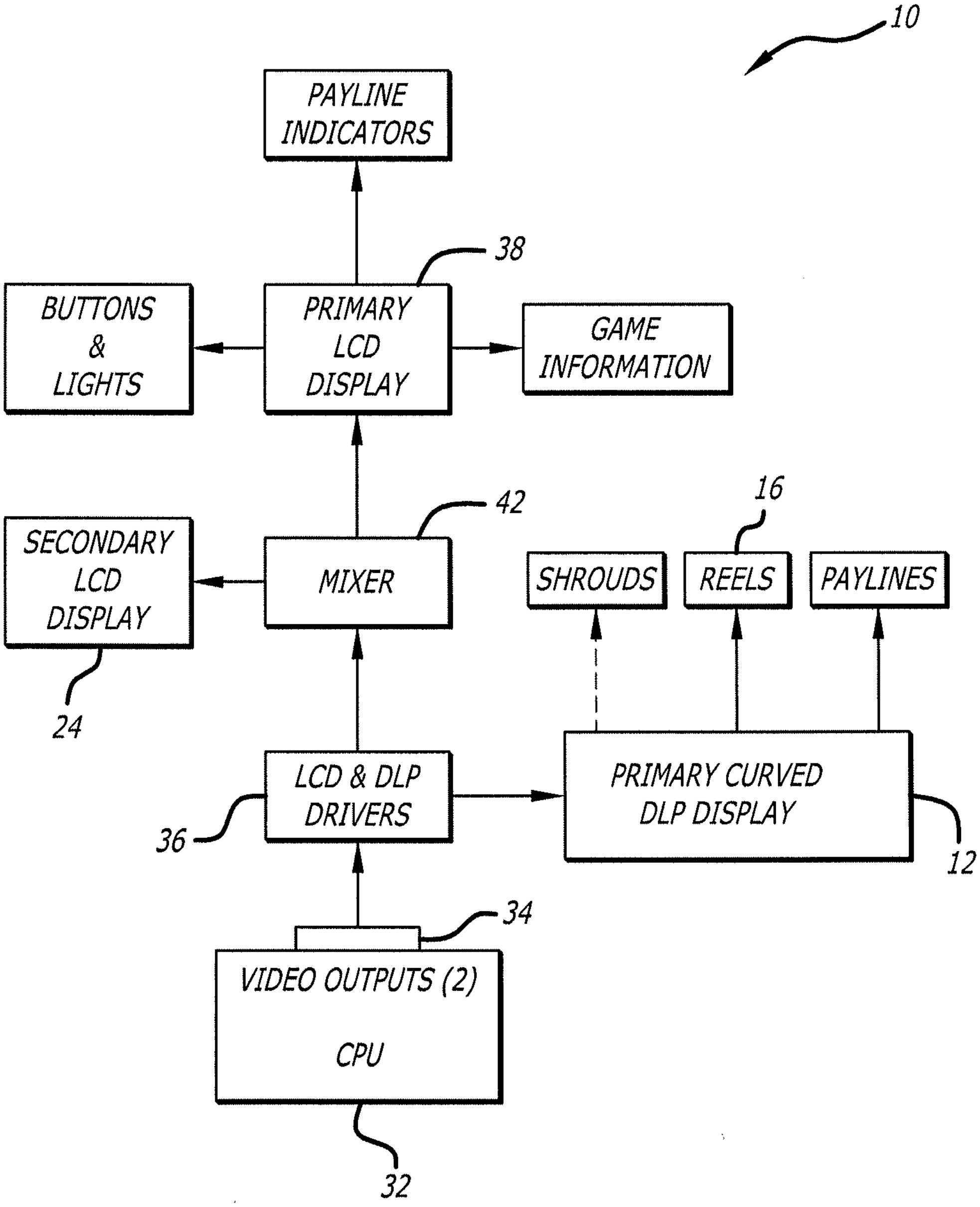
FIG. 2 is a schematic diagram of the components of a curved display system.

FIG. 2 illustrates a schematic diagram of the components of one embodiment of a gaming machine 10 having a curved display system. The gaming machine 10 includes a microcontroller with a central processing unit (CPU) 32, one or more video outputs 34, and a system memory (not shown). The CPU 32 is in communication with an LCD and DLP control driver 36 via video outputs 34. As shown in FIG. 3, the LCD and DLP control drivers 36 are integral components. In other embodiments, it is contemplated that the LCD and DLP control drivers are separate components. The LCD control driver 36 interfaces with the primary LCD display 38 and the secondary LCD display 24 via a mixer 42. In another embodiment, the LCD control driver 36 may directly interface with the primary 38 and secondary displays 24.

The primary LCD display 38 may be used to display buttons and lights, pay line indicators, and other game information such as, but not limited to, credits available, credits won, wager size, wager per pay line, or wager denomination. The secondary LCD display 24 may be used to display other game-related information such as, but not limited to, one or more bonus games, pay tables, game theme information, jackpot information, progressive jackpot information, jackpot meters, or the like. The secondary LCD 24 may also display non-gaming related information such as, but not limited to, player account information, advertisements, casino promotions, news, one or more sporting events, or the like.

FIGS. 3-5 illustrate exploded views of various embodiments of a curved display system 50. The curved display system 50 is described by relating the components of the curved display system in relation to layers with the outermost layer in front of the gaming cabinet 14 (i.e., the outer layer is closest to the game patron) and the innermost layer located within the gaming cabinet.

As shown in FIG. 3, the outermost layer of a transparent material. The transparent material 52 may be flush with the gaming cabinet 14 or slightly recessed within the gaming cabinet. In one embodiment, the transparent material 52 may be one or more layers of glass, polycarbonate, plexiglass, or other transparent material known or developed in the art. The transparent material may also include printed graphics or a printed frame around the perimeter of the transparent material. In another embodiment, the transparent material 52 may be one or more LCD displays. In yet another embodiment, the transparent material 52 or the LCD displays may also include a touch screen system 54, as shown in FIG. 5.

Referring to FIG. 3, one more shrouds 56 are placed in front of the curved material 12. The shrouds are physical pieces of material positioned in front of the curved material. The shrouds 56 are placed between the images of the reels 16 that are projected onto the curved material 12 and give the player the impression of separate reel strips. The shrouds 56 may be placed directly on the curved material 12. In another embodiment, the shrouds 56 may be positioned between the transparent material 52 and the curved material 12. In yet another embodiment, the shrouds 56 are placed on the transparent material 52. In another embodiment, the shrouds are video images that are placed between the video images of the reels.

As shown in FIGS. 3-5, a curved material 12 is positioned behind the transparent material 52. In one embodiment, a portion of the curved material 12 touches the transparent material 52. Alternatively, the curved material 12 is in a spaced relation to the transparent material 52. The curved material 12 is made of a material that is optically clear such as, but not limited to, glass, polycarbonate, plexiglass, acrylic, or the like. The curved material 12 has a radius of curvature similar to the radius of curvature of a mechanical reel. The curved material 12 may include diffusion or beaded refractive technology. The curved material 12 is generally high contrast, high resolution, and maximum uniformity. According to one embodiment, the radius of curvature is approximately 4.5" with dimensions of approximately 16.5" wide and 5.75" tall. However, as those skilled in the art will appreciate, the curved material may have any width, height, or radius of curvature that approximates or simulates the appearance of a mechanical reel. A shown in FIG. 3, the curved material 12 is a single piece of material. In another embodiment, two or more pieces of a curved material may be used to form a curved display. In one embodiment, the pieces may be slightly spaced apart to give the appearance of separate reels.

As shown in FIG. 3, a glossy coating 58 is applied to the outer surface of the curved material 12. In another embodiment, the outer surface of the curved material 12 is polished to a finish having a glossy or reflective properties. The glossy finish reflects light to further to simulate or mimic a mechanical reel. Optionally, a finish or coating 58 may be applied to the inner surface of the curved material to improve the appearance of the images projected on the inner surface, as shown in FIG. 3.

In another embodiment, the glossy coating 58 may be replaced with a gradient coating provided on the outer and/or inner surfaces of the curved material 12. The gradient coating provides greater depth of the image projected onto the curved material. The gradient coating may be darker at the periphery of the curved material 12 and lighter in the middle of the curved material. Alternatively, the gradient coating is darker in the middle of the curved material 12 and lighter about the periphery of the curved material. In yet another embodiment, the gradient coating is provided in addition to the glossy coating. For example, the gradient coating and the glossy coating both may be applied to the outer surface of the curved material 12. Alternatively, the glossy coating is applied to the outer surface of the curved material 12 and the gradient coating is applied to the inner surface of the curved material.

In another embodiment, a diffusion screen (not shown) is provided in front of or behind the curved display 12. Alternatively, the diffusion screen is coupled directly to the front and/or the back surface of the curved display 12. The diffusion screen may be made from thin, semi-flexible, acrylic optical beads. In one embodiment, a rigid metal frame encapsulates the diffusion screen to help achieve a uniform and repeatable manufacturing of the screen.

As shown in FIGS. 3-5, a DLP device 18 is positioned behind the curved material 12. The DLP device 18 projects video images onto the inner surface of the curved material 12. The DLP device 18 generally includes a DLP chip, a flywheel color filter, and a light source. In one embodiment, the light source is a high intensity discharge (HID) projector. In another embodiment, the light source is a light emitting diode (LED) projector.

The DLP device 18 may directly project video images onto the inner surface of the curved material 12 as shown in FIGS. 3 and 5. Alternatively, the video image is indirectly projected onto the inner surface of the curved material by reflecting the video images off a mirror 62, as shown in FIG. 4. In one embodiment, the DLP device 18 projects an image having a display resolution of 800×600, 1280×720, 1280×1024, or 1980×1080. As those skilled in the art will appreciate, these resolution values may be approximate as the resolution may be lower or higher than the cited resolution values. For example, the DLP device 18 may project an image of a plurality of reels onto the curved material having a resolution of approximately 1360×768. The DLP device 18 may have an aspect ratio of approximately 16:9 or any other aspect ratio depending on the size of the curved material 12. Generally, the DLP device will have a brightness of approximately 300 to approximately 500 ANSI Lumens. The color depth may be 8-bit, 16.7 M colors. As those skilled in the art will appreciate, the DLP device may have any brightness or color depth.

As shown in FIGS. 3-5, a lens 60 is positioned between the curved material and the DLP device 18. In one embodiment, the lens 60 may be an anamorphic lens that may be used to shorten or stretch the image to an appropriate size. In other embodiments, a video scaler or other software may be used to reduce or increase the size of the image in order for the image to fit within the curved display. In another embodiment, the larger image may still be projected (i.e., overscan) onto the curved material, but the extra image that is over-projected is not visible to the game patron as a screen or other partition is used to block out the periphery of the curved material. The over-projection allows the operator to digitally adjust the image of the reels and account for any tolerances that may not be maintained during the assembly of critical optical components including, but not limited to, the projector, mirror, or screens. In one embodiment, the image is over-projected by approximately 0.4 inches. As those skilled in the art will appreciate, the amount of over-projection may be a larger or smaller value depending upon the tolerances maintained during the assembly process.

In some embodiments, the edges of the projected image are bowed/distorted, thereby creating a fish-eye effect. This effect may be corrected using warping software and/or hardware to correct the projected image. In another embodiment, a warping template, which was previously created for a particular hardware configuration, may be applied to correct the projected image.

FIG. 4 illustrates a curved display system 50 in which the image of the reels is indirectly projected onto the curved material 12. The curved display system 50 includes a short-throw lens 60 and a front-coated mirror 62 to achieve the necessary image size while working with the dimensional constraints (i.e., depth) of the gaming cabinet 14. Otherwise stated, the DLP device 18 requires a particular throw distance in order to project a particular image size, but the gaming cabinet 14 is not large enough to accommodate such a throw distance. For example, according to one embodiment, the combination of the short-throw lens 60 and the front-coated mirror 62 provides a throw distance of approximately 25".

In alternate embodiments, a combination of a short-throw lens 60 and a back-coated mirror may be used to achieve the proper throw distance for the DLP device 18. In another embodiment, a combination of a short throw-lens and two or more mirrors may be used to achieve the proper throw distance. In other embodiments, two or more mirrors may be used to provide the appropriate light path length while reducing the overall depth of the enclosure. In yet another embodiment, the gaming cabinet (not shown) is sized to allow the DLP device 18 to directly project an image onto the curved display 12 without needing a short-throw lens and/or any mirrors.

FIG. 5 illustrates another embodiment of a curved display system 50 having a touch screen 54 placed in front of the curved display 12. As shown in FIG. 5, the touch screen 54 is a flat surface that is spaced apart from the curved display 12, as disclosed in U.S. patent application Ser. No. 11/209,895, filed Aug. 23, 2005, which is hereby incorporated by reference. In another embodiment, the touch screen 54 is curved to conform to or approximately conform to the shape of the curved display.

Figure 6:
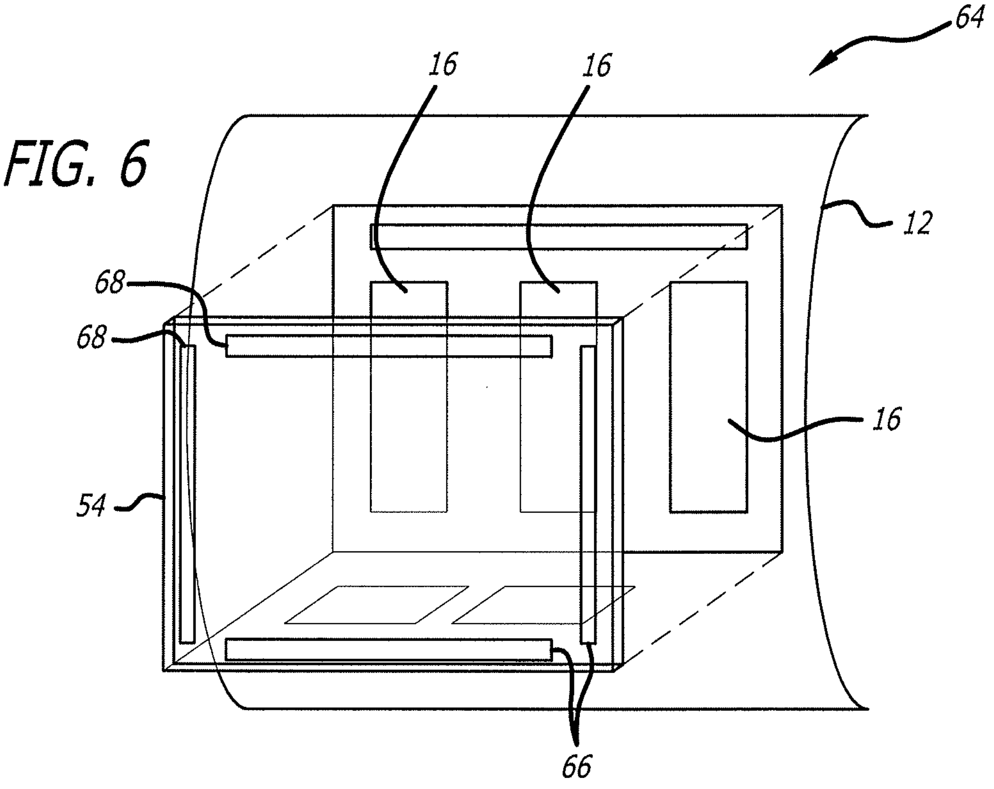
FIG. 6 is one embodiment of an exploded perspective view of the touch panel system of FIG. 5.
Figure 7:
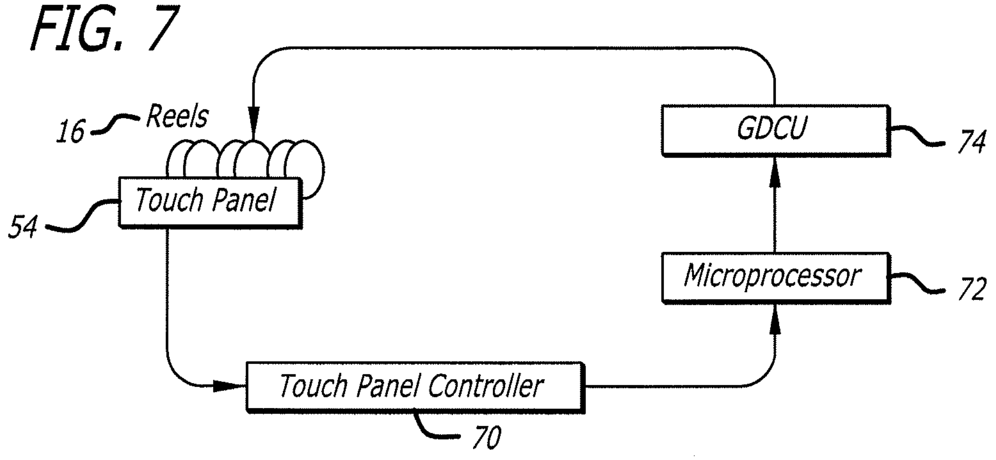
FIG. 7 is an operational flow diagram of a gaming machine having a touch panel system.
Figure 8:
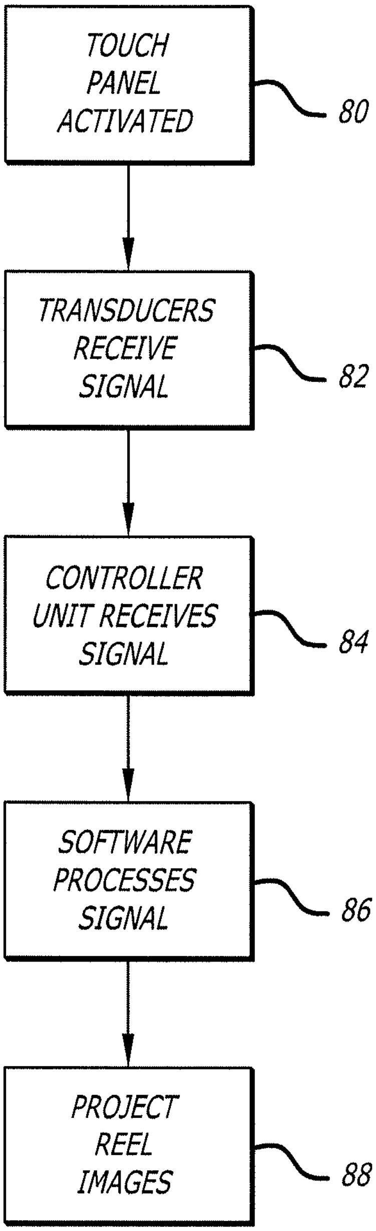
FIG. 8 is an operational flow diagram of a gaming machine having a touch panel system.

FIGS. 6-8 illustrate one embodiment of a touch sensor assembly 68 incorporating a substantially transparent touch panel 54, a touch controller 70, and touch panel software. As shown in FIG. 6, the touch panel 54 utilizes the touch sensor assembly 68 to produce touch data when touched or activated, as well as allowing substantially unobstructed viewing of the projected images of the reels shown on the curved display 12 behind the touch panel. The touch sensor assembly 68 includes one or more touch pad areas (not shown), one or more touch transducers 66, wave reflectors (not shown), cabling (not shown), a bezel (not shown), a touch panel controller 70, touch panel driver software, and touch panel application software. The material for the touch pad areas (not shown), is either glass or other polymeric material suitable for propagating surface acoustic waves.

Additionally, the transducers 66 are able to adhere to the skin of the glass-like materials of the touch panel 54 sufficiently to pass around curves. This allows a curved touch panel (not shown) to be utilized without detrimental effects. Accordingly, in one embodiment, the touch panel 54 has a radius of curvature similar to the curved display 12. Also, one of ordinary skill in the art will appreciate that while the touch panel 54 is shown to be rectangular in shape with respect to FIG. 6, the touch panel may be designed to accommodate the shape of any gaming machine configuration (e.g., circle, semi-circle, triangle, and the like).

As shown in FIG. 7, the touch panel 54 is placed in front the projected images of the reels 16. Touch panel data received by the touch panel 54 is transmitted to the touch panel controller. The touch panel controller 70 acts to control and interpret touch data from the touch panel 54. The controller 70 typically includes a printed circuit board assembly, often encased inside a metal or plastic housing with mounting holes. In one embodiment, the controller 70 is mounted to the inside of the gaming machine door or cabinet, and is preferably within reach of the touch panel wiring (not shown). The controller 70 is wired to the appropriate power and communication connections within the gaming machine. The controller 70 outputs a data stream consisting of touch coordinate information.

In one embodiment, the microprocessor 72 runs an application that translates the touch panel controller 70 serial touch information into reel control commands for the GDCU reel controller 74. The application uses drivers to communicate with the GDCU 74 which controls the projection of the image onto the curved display 12. The GDCU 74 is a communications portion of the gaming machine 10 which “talks” to the different components of the gaming machine.

FIG. 8 illustrates the operational flow of a gaming machine including a touch panel system. As shown in FIG. 8, the logical operations of the various embodiments of the touch screen system are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the touch panel system. Accordingly, the logical operations making up the embodiments of the touch panel system described herein are referred to variously as operations, structural devices, acts or modules. It will be recognized by one skilled in the art that these operations, structural devices, acts and modules may be implemented in the system, in the firmware, in the special purpose logic, analog circuitry, or any combination thereof.

As shown in FIG. 8, the logical operations of a touch panel system 64 utilize the components of the system in a logical sequence. In the panel activation step 80, the touch panel 54 is activated. This occurrence produces a signal that is received by the transducers 66 associated with the touch panel 54 in the transducer signaling step 82. In the controller signaling step 84, a signal is sent to the touch panel controller 70 reporting the activation of the touch panel 54. From the touch panel controller 70, a signal is then sent to, and interpreted by, the touch panel software (which is in the microprocessor 70) in the signal processing step 86. Finally, the touch panel software sends a signal to the GDCU reel controller 74 to activate the DLP device 18 in the mechanical activation step 88.

Figure 9A:
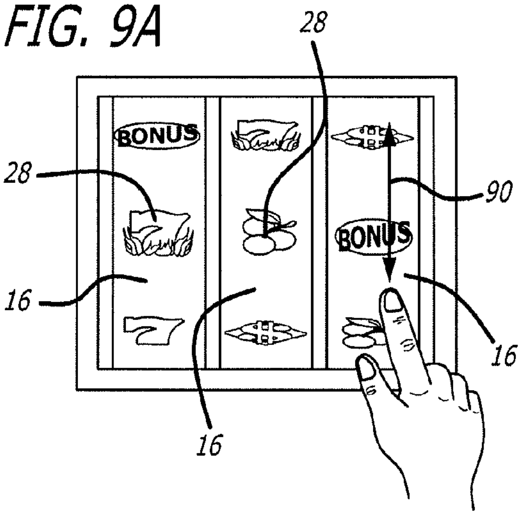
FIGS. 9A-9B illustrate one embodiment of a touch gesture for initiating a game presented on a gaming machine.
Figure 9B:
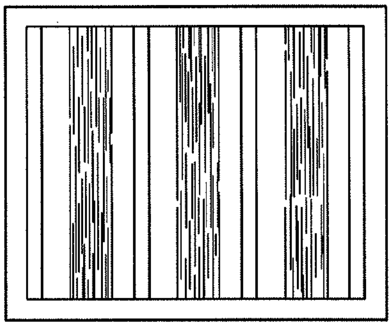

The touch panel system 64 is adapted to detect and interpret different types of touch data. For example, FIGS. 9A-9B illustrate one embodiment in which touch data in the form of a touch gesture 90 generally parallel to the reels will cause the projected image of the reels to spin. The touch gesture in a “slide up” or “slide down” motion will initiate the spinning of the reels as shown in FIG. 9B. The gesture causes the reels to spin in the particular direction of the gesture. For example, if the gesture moves top-down on the touch screen, the reels spin in a top-down direction. Alternatively, if the gesture moves bottom-up on the touch screen, the reels spin in a bottom-up direction. Additionally, the speed of the gesture may affect the speed of the spinning of the reels. For example, if the gesture is fast, the reels spin fast, whereas the reels will spin slower for a slower gesture. Generally, any gesture on the touch screen that is parallel to the image of the reels will cause all the reels to spin. In another embodiment, the player needs to make a gesture at a particular area adjacent to the image of the reels in order to cause the image of the reels to spin. In yet another embodiment, the player can gesture to control each reel. Accordingly, the player may vary the order and/or speed of each reel spun.

Figure 10A:
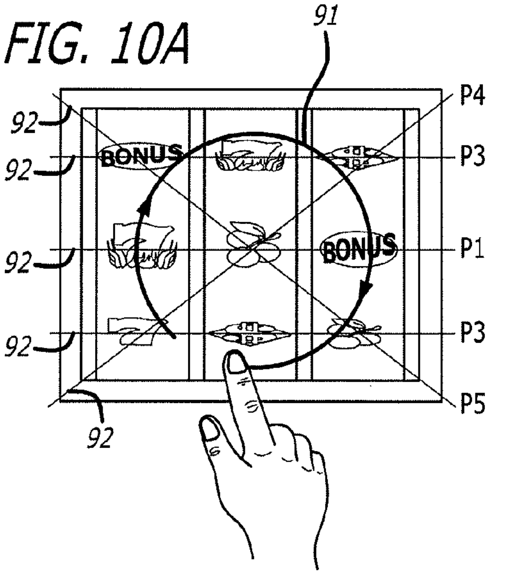
FIGS. 10A-10B illustrate one embodiment of a touch gesture for selecting active pay lines.
Figure 10B:
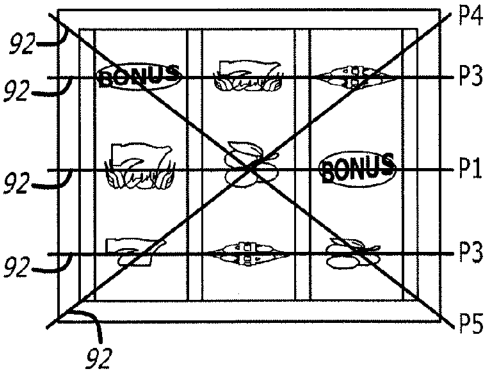

FIGS. 10A-10B illustrate touch gestures related to placing a wager or selecting a pay line. For example, in one embodiment, touch data sensed at the location near a pay line will result in the selection of the pay line for play. If the touch data is a circular motion 91 that covers one or more paylines 92, this touch gesture is interpreted as selecting two or more pay lines, as shown in FIG. 10A. For example, the circular gesture encompasses or touches all pay lines, and then all the pay lines are selected. Alternatively, if the circular gesture only encompasses three pay lines, those three pay lines are selected for play. As shown in FIG. 10B, the pay lines located within the touch gesture are highlighted on the screen and active for game play.

Figure 11C:
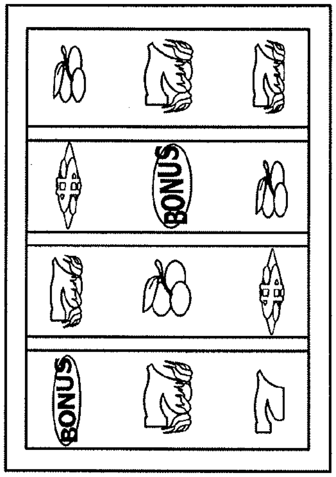
FIGS. 11A-11C illustrate touch gestures for adding and removing reels from a game.
Figure 11B:
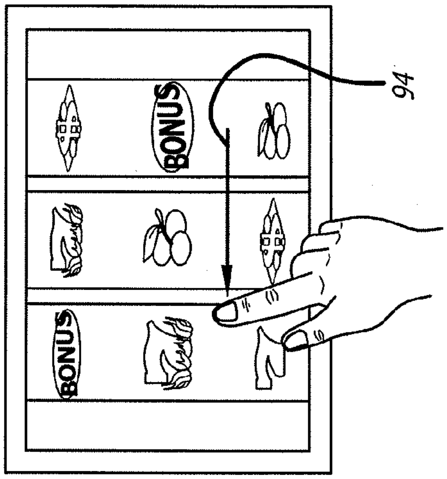
Figure 11A:
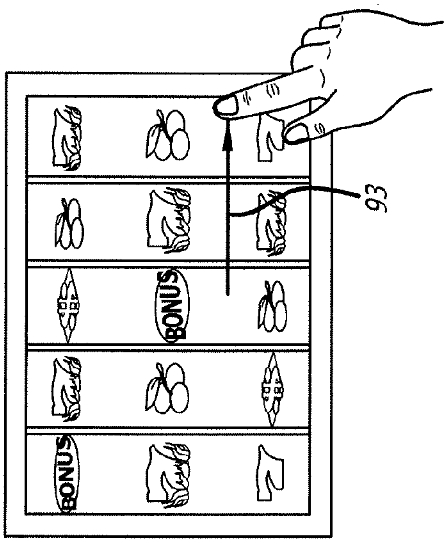

FIGS. 11A-11C illustrate various screen shots of touch gestures that add or remove reels from the game. A generally-perpendicular, touch gesture 93 in a direction away from the reels is interpreted as a player request to remove reels. FIG. 11A shows a five-reel game and a player touch gesture 93 (away from the reels toward the edge of the screen). As a result, two reels are removed from the game, and the curved display projects an image of a three-reel game as shown in FIG. 11B. According to one embodiment, each generally-perpendicular touch gesture in a direction away from the reels causes one reel to be removed. In another embodiment, each generally-perpendicular touch gesture causes a predetermined number of reels (e.g., two reels) to be removed from the game. As those skilled in the art will appreciate, the game is configured to have a predetermined minimum number of reels for a particular game.

As shown in FIG. 11B, a generally-perpendicular touch gesture 94 from the edge/side of the curved display toward the center of the display causes one or more reels to be added to the game. As shown in FIG. 11C, the touch gesture 94 of FIG. 11B causes one reel to be added to the game to form a four-reel game. A gesture 93, 94 may be programmed to add one reel or add a predefined group of reels (e.g., two, three, or more reels per gesture).

Figure 12A:
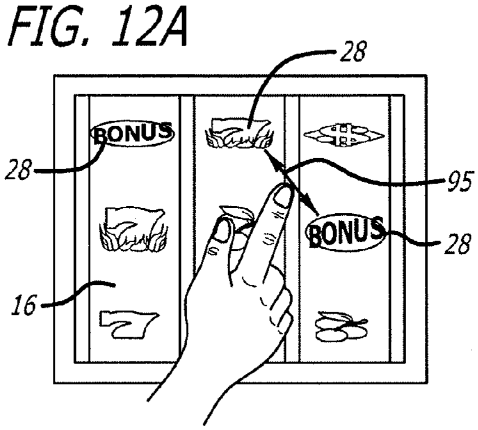
FIGS. 12A-12B illustrate one embodiment of a touch gesture for moving symbols between reels of a game.
Figure 12B:
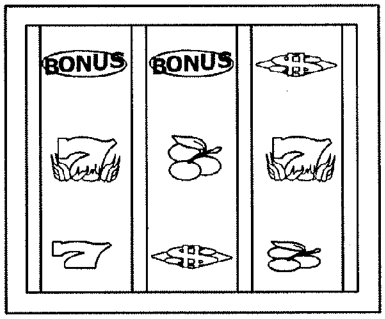

FIGS. 12A-12B illustrate another embodiment of touch gestures 95 that allow a player to move symbols 28 between reels 16. As shown in FIG. 12A, the gesture is touching the positions on the touch screen corresponding to two game indicia (e.g., with the thumb and middle finger) and drawing the thumb and middle finger together. This gesture will cause two symbols to swap positions on the reels as shown in FIG. 12B.

As shown in FIGS. 12A-12B, a player is able to swap symbols between adjacent reels. Alternatively, the player may be able to swap symbols between non-adjacent reels. In another embodiment, the touch data may be a gesture that allows a player to change the order of symbols on the same reel. In one embodiment, only adjacent symbols on the same reel may be swapped. Alternatively, any symbols on the same reel may be swapped. The touch screen may be activated during certain portions of a game to allow a player to swap symbols. For example, the touch screen may be activated for a predetermined period of time after a game has completed. Accordingly, a player may attempt to achieve a winning outcome or improve a winning outcome by swapping symbols.

In various embodiments, the ability to swap symbols may be a feature of the game or the player must have satisfied some predefined criteria to permit this feature of the game. For example, the predefined criteria may be one or more maximum wagers, a predefined period of continuous play, a particular player club level, accrual of a particular number of player club points, or any other trigger events known or developed in the art. As those skilled in the art will appreciate, the game may be limited to only allow the player to swap certain game indicia. Alternatively, the game may allow any swapping of game indicia between reels or on the same reel. Optionally, the game may allow more than one swap per game.

Figure 13A:
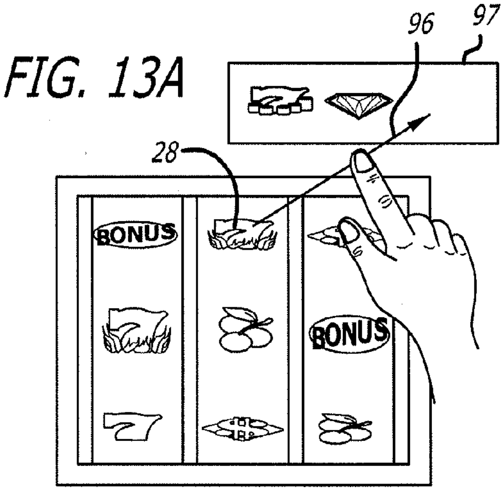
FIGS. 13A-13D illustrate touch gestures for adding and removing symbols from reels of a game.
Figure 13B:
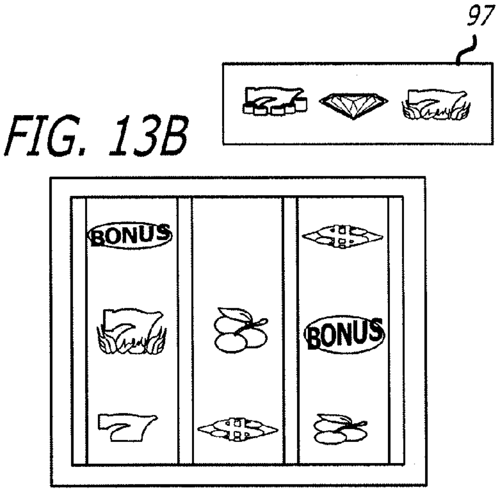
Figure 13C:
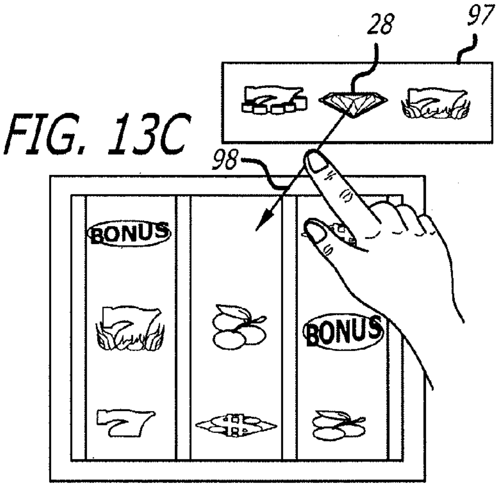
Figure 13D:
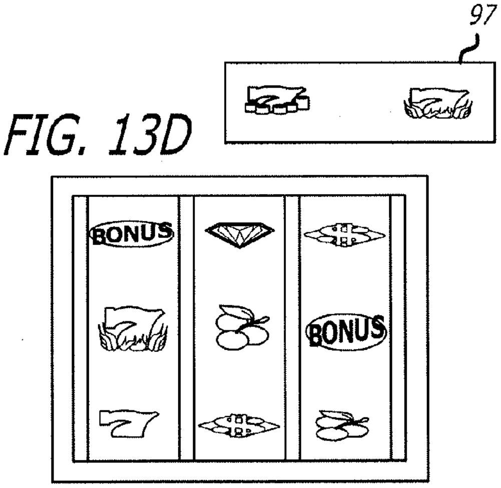

In yet another embodiment, the touch screen is configured to accept touch data that allows a player to add a game indicia onto one or more reels or remove one or more indicia from a reel as shown in FIGS. 13A-13D. FIG. 13A illustrates one embodiment in which a touch gesture 96 from a game indicia 28 on one of the reels to a symbol bank 97 causes the game indicia to be moved from the reel to the symbol bank as shown in FIG. 13B. FIG. 13C illustrates one embodiment in which a touch gesture 98 from a symbol bank 97 to a reel 16 causes a game indicia 28 to be added to a reel at the position in which the touch gesture terminates, as shown in FIG. 13D. In another embodiment, the game indicia may be randomly added to a reel. Generally, the game indicia is added or removed prior to game play or after a game has ended. Optionally, the game indicia may be added while the reels are spinning. The touch screen may be activated to allow such gestures in response to a wager, game outcome, some player characteristic, or a trigger event.

In another embodiment, the touch screen is configured to accept touch data that allows a player to define a pay line. Accordingly, a player may drag a finger across the screen to connect a number of positions on one or more reels to form a pay line. For example, in a three-reel game having three pay lines (i.e., the display shows three symbols on each reel), the player may define a pay line that is composed of two symbol positions on the first reel and one symbol position on the second reel. These symbol positions are generally composed of three adjacent symbol positions. Alternatively, the pay line is composed of three non-adjacent symbol positions. In another embodiment, the pay line may be composed of merely three symbol positions on any number of the reels. As those skilled in the art will appreciate, a five-reel game having a touch screen may allow a player defined pay lines.

Figure 14:
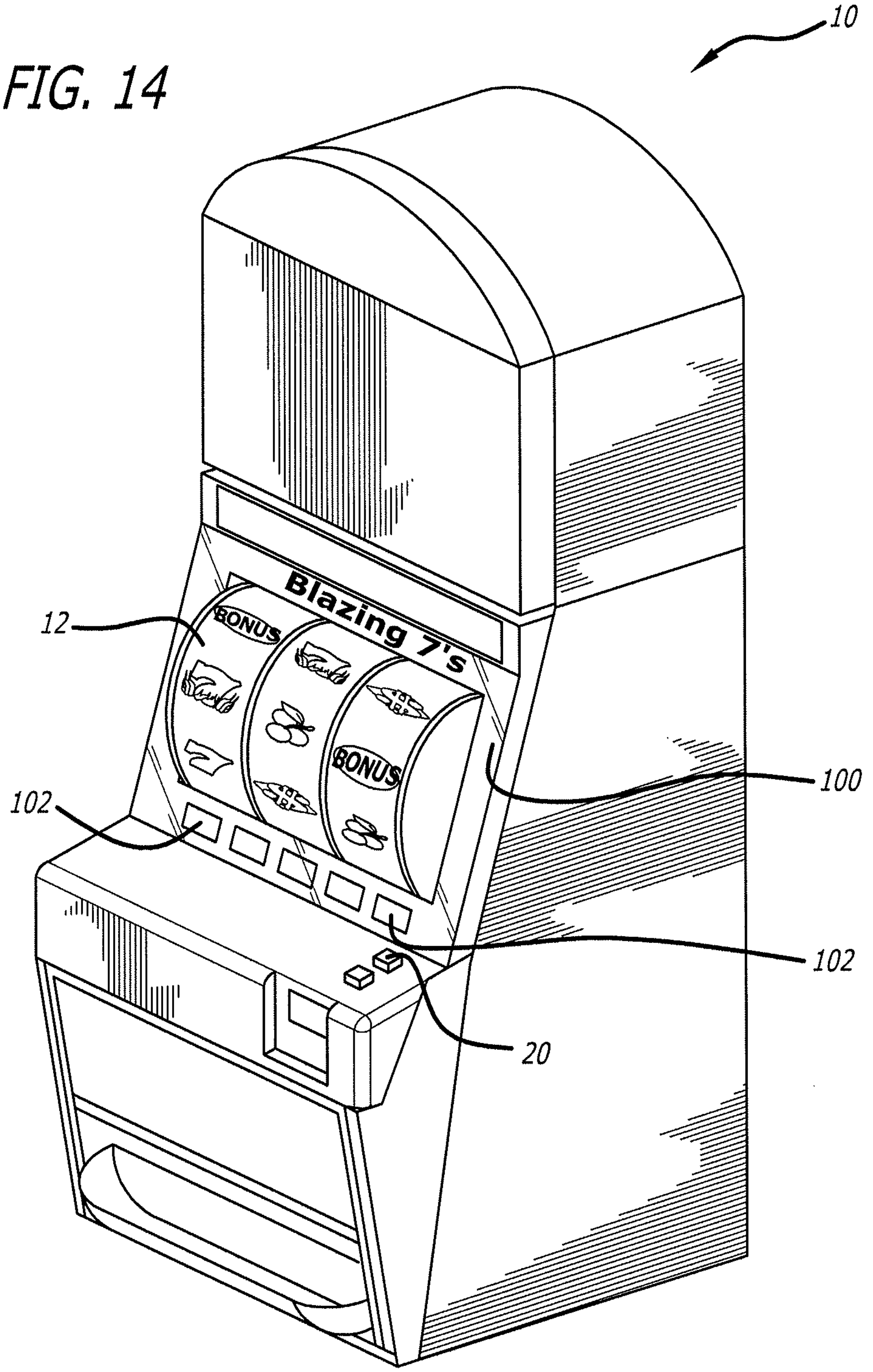
FIG. 14 is a perspective view of one embodiment of a curved display system for a video gaming machine.

FIG. 14 illustrates another embodiment of a gaming device 10 having a curved display 12 and a LCD 100. Generally, the LCD 100 is a flat panel display, but the LCD may be curved (e.g., concave, convex, or a combination thereof). As shown in FIG. 14, the LCD 100 includes an opening sized to allow at least a portion of the curved display 12 to protrude through the opening. As shown in FIG. 14, the entire curved display 12 is protruding through the opening of the LCD 100. In another embodiment, the opening of the LCD 100 is sized to allow only a portion of the curved display 12 to protrude through the opening. In yet another embodiment, the curved display 12 is positioned behind the opening of the LCD 100.

The LCD 100 may present gaming and non-gaming related information. The gaming information may include, but is not limited to, available credits, credits wagered, credits wagered per pay line, active pay lines, a win meter, a wager denomination, an indicia representing selected pay lines, a maximum bet amount, an amount wagered, or any combination thereof. Other gaming information includes, but is not limited to, game instructions, one or more help menus, one or more pay tables, jackpot or progressive jackpot or game information, tournament game information, community gaming information, notification of a bonus game, number of bonus points, animation, images (e.g., still or video), or other features related to game play or the game theme.

In addition to gaming information, the LCD 100 may present non-gaming information during or prior to the game (e.g., during an attract mode). The LCD 100 may present either still images, video images, or graphics related to the game title or game theme. Optionally, the LCD 100 may present information not related to the game such as, but not limited to, player tracking account information, advertisements, a news ticker, sports ticker, safety information (e.g., warnings regarding responsible gaming, fire alarms, or the like), or status of a drink and/or food order.

In yet another embodiment, the LCD 100 may present a player interface having one or more images of buttons 102. The buttons 102 may be related to game play (e.g., spin reels or activate a bonus game) or wagering activities such as, but not limited to, selecting a wager denomination, selecting a wager amount, placing a maximum bet, placing a minimum bet, or cashing out remaining credits.

In another embodiment, the LCD 100 of FIG. 14 is substituted with a display screen having a similar shape (i.e., display with an opening). Alternatively, the curved display and the display screen are integral. The display screen may present both gaming and non-gaming information. This information is presented on the display screen using a DLP device. In one embodiment, a single DLP device is used to present the information on the display screen and the game on the curved display. Alternatively, one or more DLP devices may be used to present the information on the display screen and the curved display 12.

Figure 15:
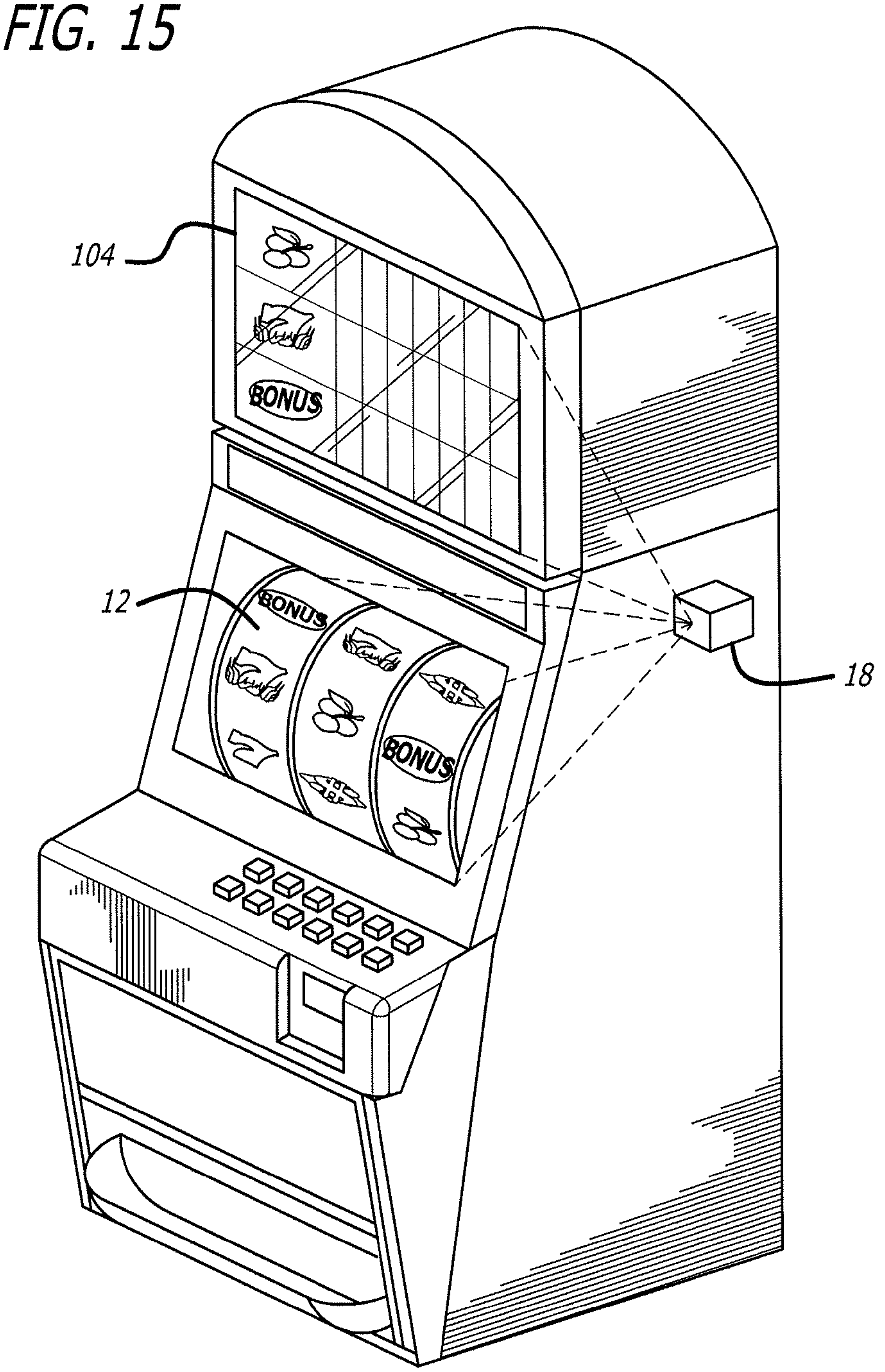
FIG. 15 is a perspective view of another embodiment of a gaming machine having a curved display and a secondary display positioned above the curved display.

FIG. 15 illustrates one embodiment of a gaming machine 10 having a curved display 12 and a secondary display screen 104 positioned above the curved display. In one embodiment, the secondary display screen 104 is a LCD, plasma, CRT, or other display device such as, but not limited to, one or more reels or wheels. In another embodiment, the secondary display 104 is a DLP display screen. In one embodiment, a single DLP device is used to project images on the curved display and the secondary display, as shown in FIG. 15. Alternatively, the curved display 12 and the secondary display 104 have dedicated DLP devices.

Figure 16:
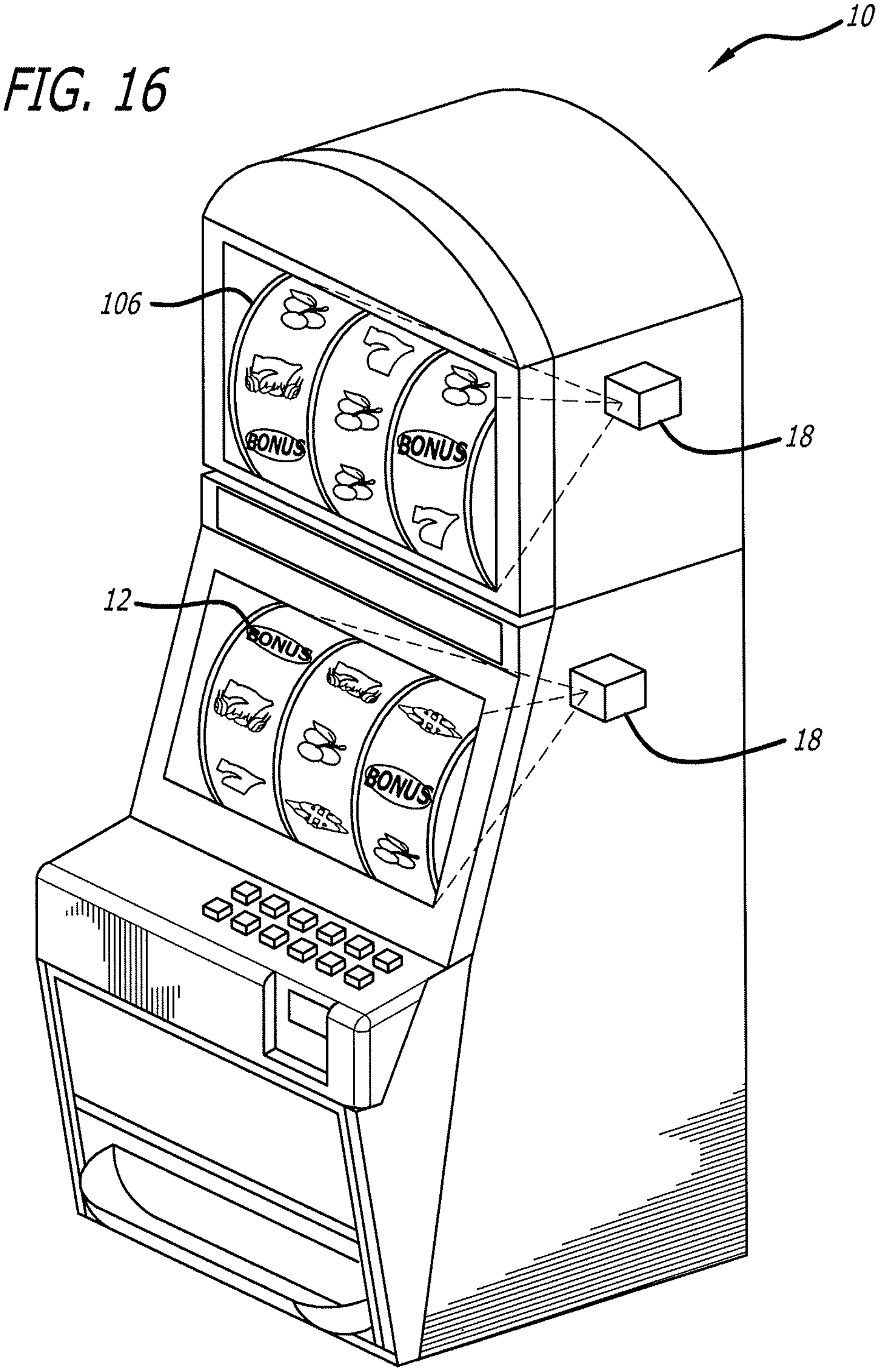
FIG. 16 is a perspective view of an embodiment of a gaming machine having a main curved display system and a secondary curved display system.

FIG. 16 illustrates another embodiment of a gaming machine 10 having a curved display 12 that is used both a primary display and a secondary display 106. In one embodiment, a single DLP device is used to project still and video images onto both the curved display 12 and the secondary display 106. As shown in FIG. 16, each curved display 12, and 106 has a dedicated DLP device.

Figure 17A:
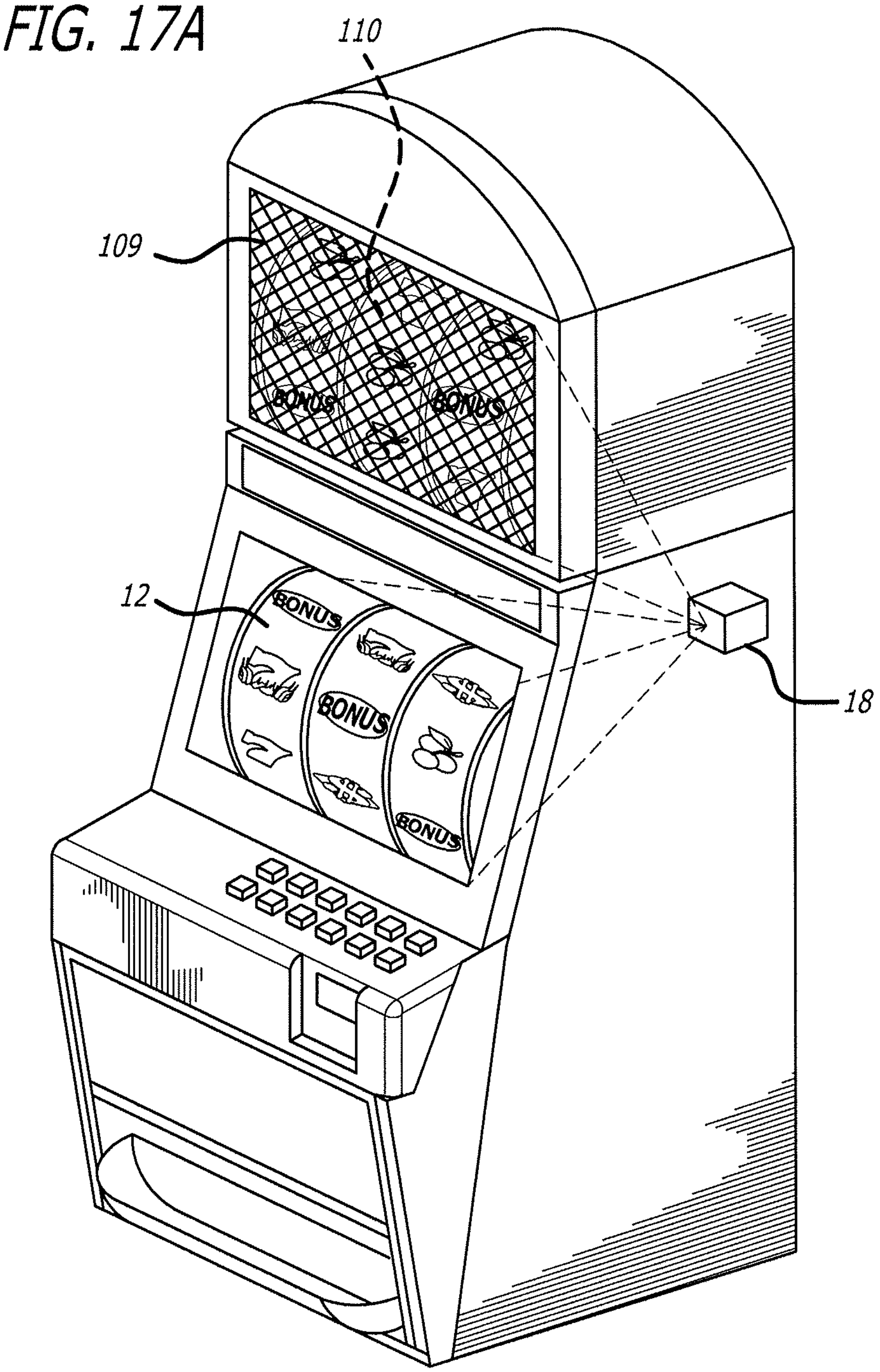
FIGS. 17A-17B are perspective views of an embodiment of a gaming machine having a main curved display system and a secondary display system composed of a LCD positioned in front of a curved display system.
Figure 17B:
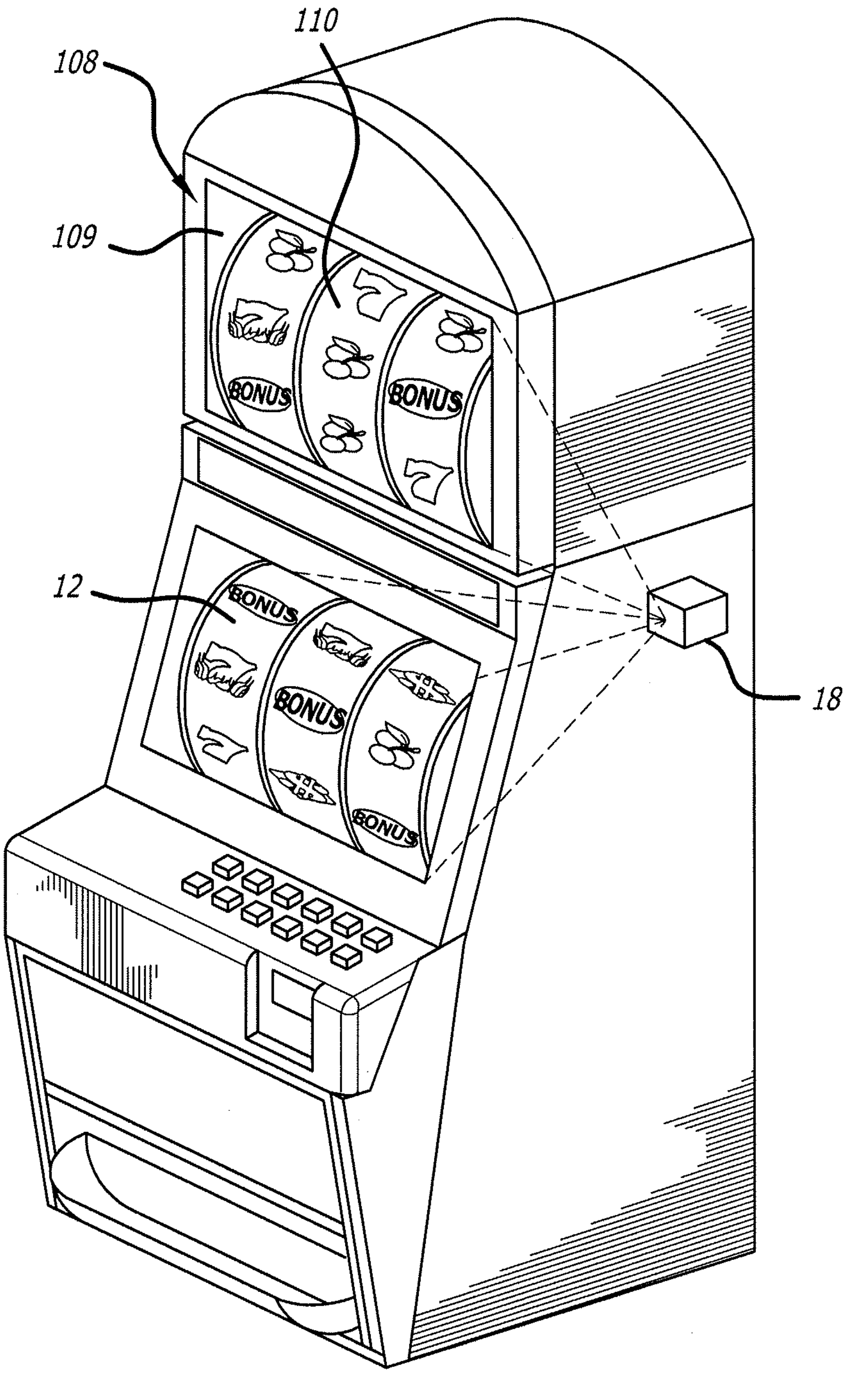

FIGS. 17A-17B illustrate another embodiment of a gaming machine having a curved display 12 and a secondary display 108. The secondary display 108 is composed of a LCD 109 that is placed in front of a secondary curved display 110. As shown in FIG. 17A, the LCD 109 obscures the secondary curved display 110. The LCD 109 may present a bonus game, game-related information, or non-game related information. As shown in FIG. 17B, the LCD 109 is transmissive such that the secondary curved display 110 is visible to the game patron. In some embodiments, the polarizers associated with the LCD 109 may be removed from the LCD as some LED projectors are not powerful enough to overcome the polarizers in the LCD.

Figure 17C:
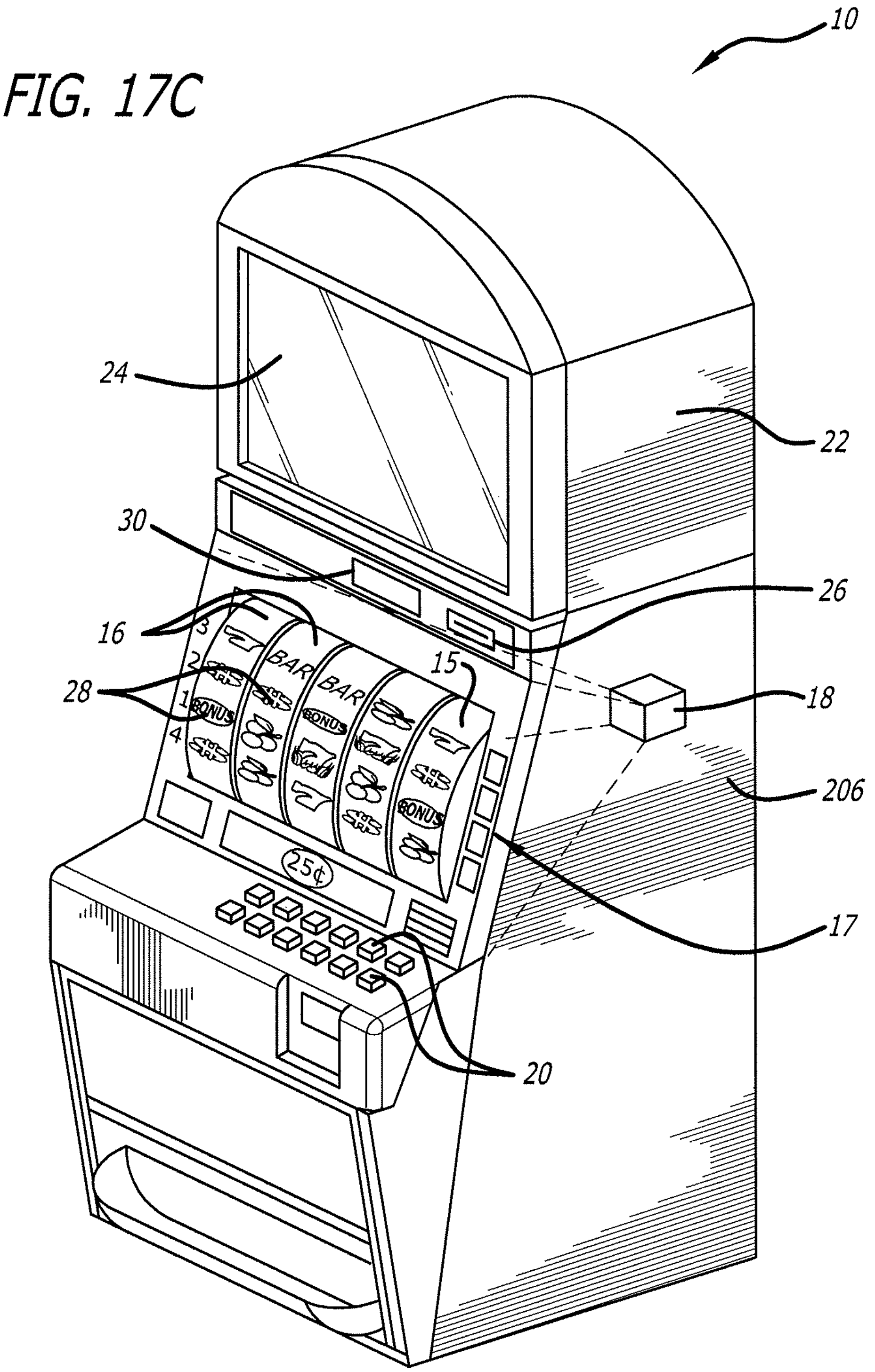
FIG. 17C is a perspective view of another embodiment of a gaming machine having a curved display.

FIG. 17C illustrates another embodiment of a gaming machine having a molded main display. The molded main display has a curved main portion 15 and flat surfaces 17 positioned around the perimeter of the curved main portion. The flat surfaces 17 present game information such as, but not limited to, payline information (e.g., active/inactive paylines, wager per payline, payline number), game instructions, possible wager denominations, selected wager denomination, total credits won, total credits wagered, credits remaining, graphics, game title banners, images and/or video clips related to the game and/or game theme, or any combination thereof. In this embodiment, a single DLP device 18 projects the game onto the curved screen 15 and the game information onto the flat surfaces 17.

Figure 19:
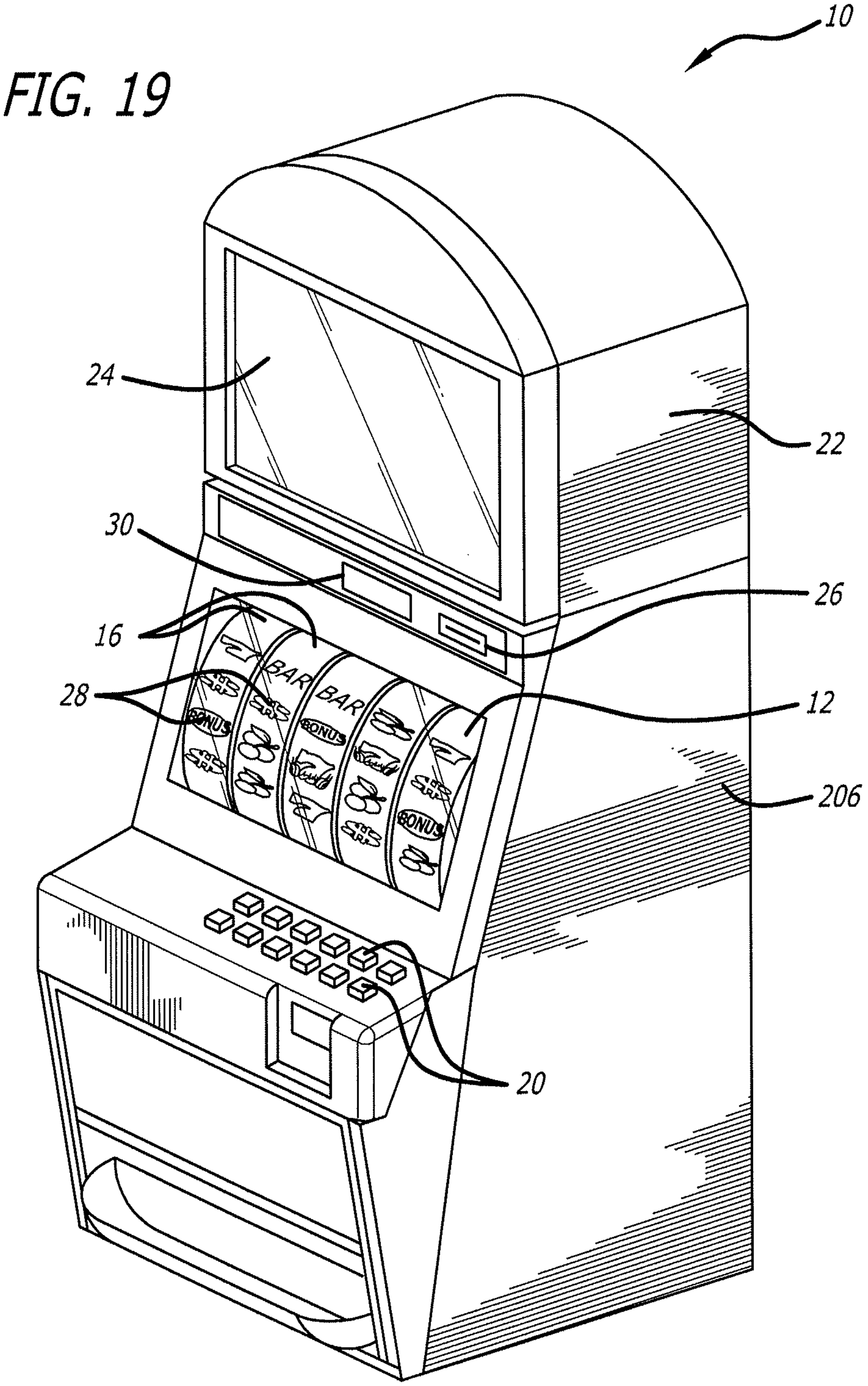
FIG. 19 is a perspective view of yet another embodiment of a gaming machine having a curved display.
Figure 20:
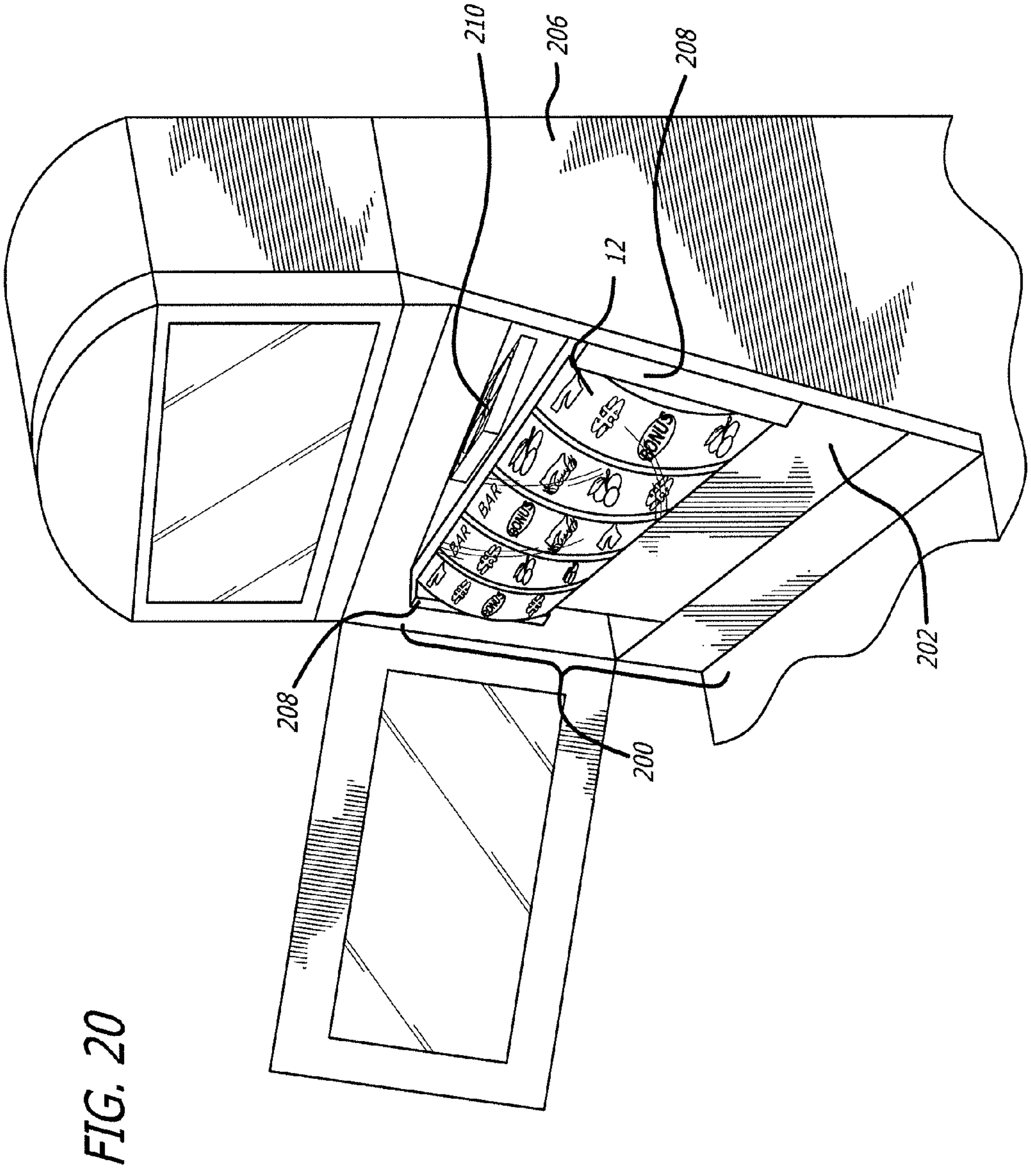
FIG. 20 is a perspective view of the gaming machine of FIG. 19 with the main door opened.
Figure 21:
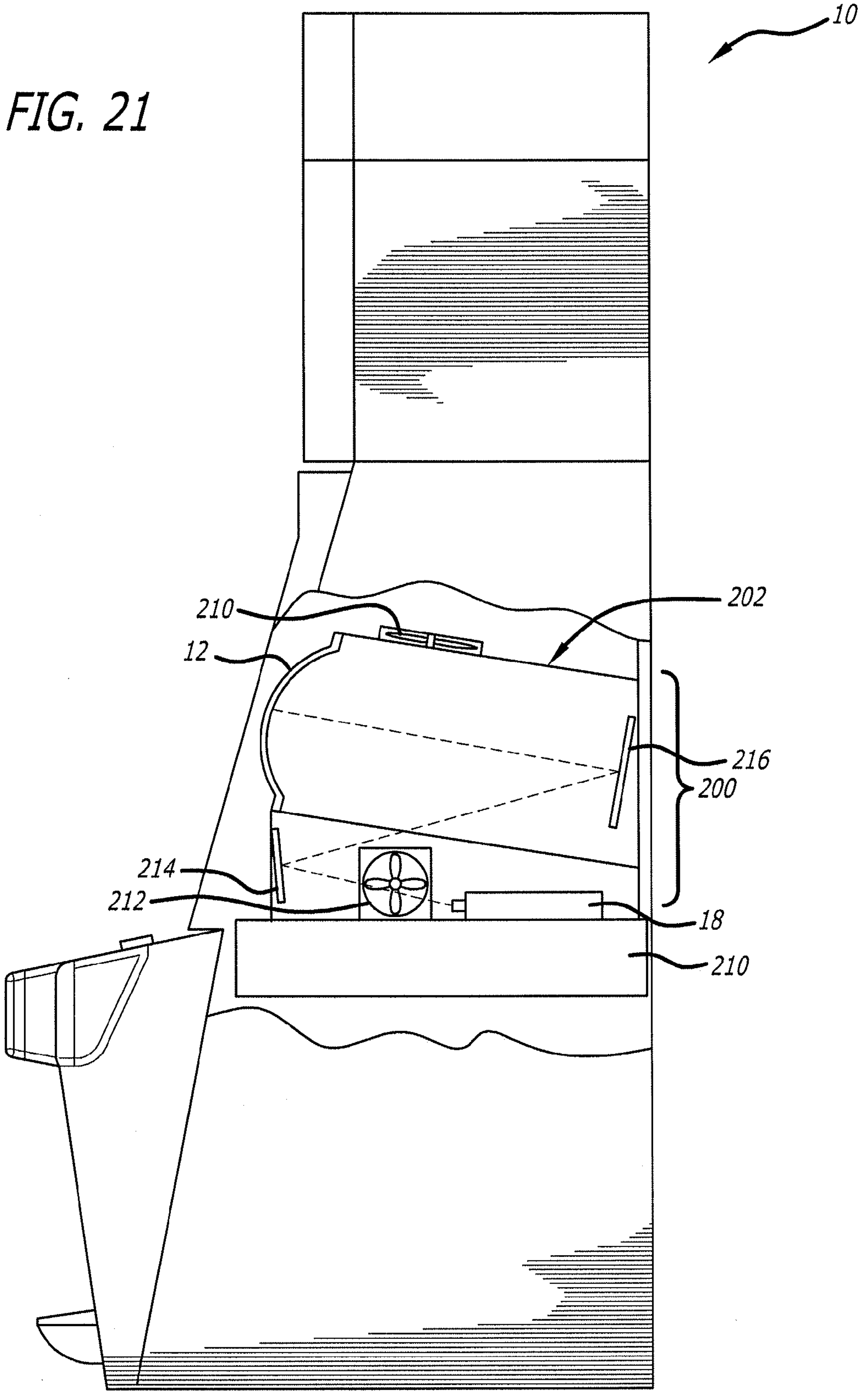
FIG. 21 is a cutaway, side view of the gaming machine of FIG. 19.

FIGS. 19-21 illustrate one embodiment of a self-contained projection system 200 that includes a curved display 12 and the associated projection components. The self-contained projection system 200 includes an enclosure 202 that is sealed to prevent dirt, dust and debris from contaminating the interior of the enclosure because any contaminants will adversely affect the light path (i.e., the path of light from the projector lens to the mirrors and to the curved material). The enclosure 202 may have one more walls 204 in combination with the curved material 12 to provide a sealed housing. As shown in FIGS. 20-21, the curved material 12 is coupled to the front of the enclosure 202. The interior of the enclosure 202 of the projection system 200 may include a light absorbing coating to absorb any stray or additional light rays from the projection source. The light absorbing coating may be, for example, black paint, powder coating, or a black texture coat.

Optionally, an aperture (not shown) may also be positioned in front of the projection source (or within the lens of the projection source) to reduce any stray light from reflecting within the enclosure. The aperture may be a flat material having one or more openings corresponding to the images being projected onto the curved display.

The self-contained projection system 200 is mounted within a gaming cabinet 206 comprising brackets 208 provided on the sides of the enclosure 202, as shown in FIG. 20. The brackets 208 include openings and/or recesses for coupling the bracket to the sides of the gaming cabinet 206. The inner surface of the brackets 208 also includes a recessed curved groove (not shown) sized and shaped to accommodate the curved material 12. In another embodiment, the enclosure 202 is positioned on top of a shelf 210 or other horizontal platform provided within the cabinet. In yet another embodiment, the self-contained system 200 is coupled to the sides of the gaming cabinet 206 and rests on a platform 210, as shown in FIG. 21. Optionally, one or more shock absorbers (e.g., bushings, gaskets, springs) may be placed between the self-contained system 200 and the gaming cabinet to isolate the system from any jarring forces or shock impulses.

Because the self-contained projection system 200 is sealed, one or more fans or heat pumps are provided to remove heat from the enclosure 202. For example, a fan 210 is provided at the top of the enclosure 202, and a fan 212 is provided near the DLP projector as shown in FIG. 21.

In FIG. 21, a DLP projector 18 is placed at the base of the enclosure 202. A cradle (not shown) fixes the DLP device 18 to the base of the enclosure 202 in order to ensure proper calibration of the projection system. The cradle (not shown) may be one or more brackets, jigs, and/or mounts cast, molded, or bolted to the base of the enclosure.

As shown in FIG. 21, a mirror 214 is placed at the front of the enclosure 202 near the base of the enclosure, and another mirror 216 is placed at the back of the enclosure 202 near the top of the enclosure. The mirrors 214, 216 are front glass mirrors or any other mirrors known or developed in the art that substantially reflect the image projected onto the mirror. The mirrors 214, 216 are substantially flat and generally rectangular in shape. According to one embodiment, the lower mirror 214 is smaller in size as compared to the upper mirror 216.

The lower mirror 214 is angled such that the bottom of the mirror is further away from the front of the enclosure 202 as compared to the top of the mirror. Similarly, the upper mirror 216 is angled so that the bottom of the mirror is closer to the front of the enclosure as compared to the top of the mirror. That is, the lower and upper mirrors 214, 216 are angled to reflect the projected image upwards and ultimately to the curved material 12. The mirrors 214, 216 reduce the overall depth of the enclosure 202 by dividing the light path. In other embodiments, the mirrors may be angled in any direction or at any angle to ensure that the projected image is reflected onto the curved material.

In one embodiment, the mirrors 214, 216 are attached to a hinge (not shown) in order to adjust the angle of the mirrors. In another embodiment, a remotely controlled motor (not shown) is coupled to the mirrors 214, 216 by a force transmission member (not shown) in order to adjust the angle of the mirrors 214, 216. In yet another embodiment, one or more shims are used to adjust and fix the position of the mirrors. In another embodiment, the lower mirror 214 is adjustable and the upper mirror 216 is mounted at a fixed angle. Alternatively, the lower mirror 214 is fixed and the upper mirror 216 is adjustable. Optionally, the angle of the mirrors 214, 216 may also be adjusted by a laser alignment process. A laser is used during the assembly process to ensure that the optical path is properly aligned and calibrated.

Figure 18:
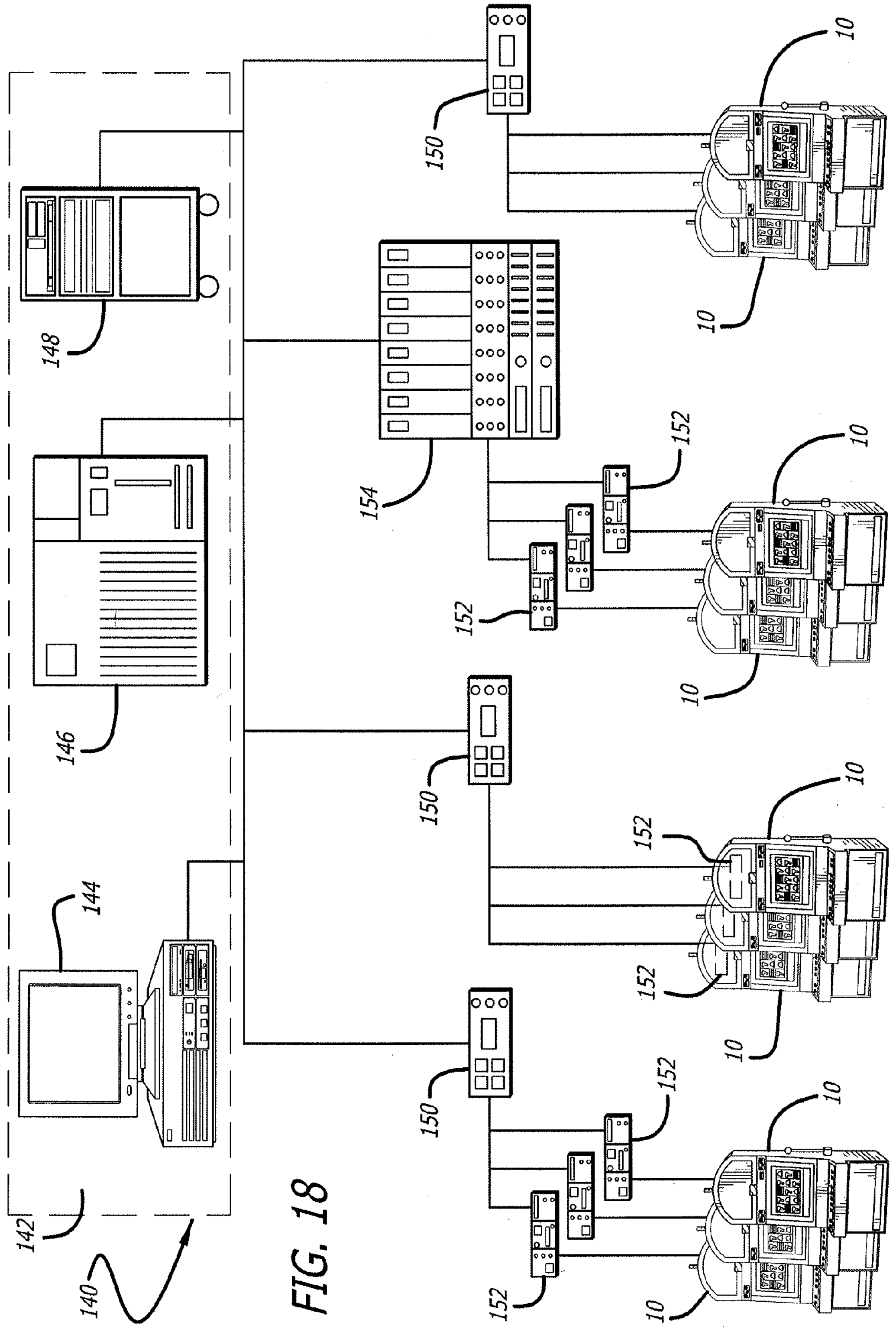
FIG. 18 is a schematic representation of one embodiment of a gaming system including one or more gaming machines having curved displays.

FIG. 18 illustrates a casino gaming system that may include one or more gaming machines 10 that have a curved display. The casino gaming system 140 comprises one or more gaming machines 10. The gaming machines 10 illustrated in FIG. 18 act as terminals for interacting with a player playing a casino game. Networking components facilitate communications between the system server 142 and game management units 152 that control displays for carousels of gaming machines 10 across a network. Game management units (GMU's) 152 connect gaming machines to networking components and may be installed in the gaming machine cabinet or external to the gaming machine 10. The function of the GMU 152 is similar to the function of a network interface card connected to a desktop personal computer (PC). Some GMU's 152 have much greater capability and can perform such tasks as presenting and playing a game using a display (not shown) operatively connected to the GMU 152. In one embodiment, the GMU 152 is a separate component located outside the gaming machine 10. Alternatively, in another embodiment, the GMU 152 is located within the gaming machine 10. Optionally, in an alternative embodiment, one or more gaming machines 10 connect directly to a network and are not connected to a GMU 152.

The gaming machines 10 are connected via a network to a network bridge 150, which is used for networking, routing and polling gaming machines, including slot machines. The network bridge 150 connects to a back end system 142. Optionally, the gaming machines 10 may connect to the network via a network rack 142, which provides for a few number of connections to the back end system 142. Both, network bridge 150 and network rack 154 may be classified as middleware and facilitate communications between the back end system 142 and the game management units 152. The network bridges 150 and network rack 154 may comprise data repositories for storing network performance data. Such performance data may be based on network traffic and other network-related information. Optionally, the network bridge 150 and the network rack 154 may be interchangeable components. For example, in one embodiment, a casino gaming system may comprise only network bridges and no network racks. Alternatively, in another embodiment, a casino gaming system may comprise only network racks and no network bridges. Additionally, in an alternative embodiment, a casino gaming system may comprise any combination of one or more network bridges and one or more network racks.

The back end system 142 may be configured to comprise one or more servers. The type of server employed is generally determined by the platform and software requirements of the gaming system. In one embodiment, as illustrated in FIG. 18, the back end system 142 is configured to include three servers: a slot floor controller 144, a casino management server 146 and a casino database 148. The slot floor controller 144 is a part of the player tracking system for gathering accounting, security and player specific information. The casino management server 146 and casino database 148 work together to store and process information specific to both employees and players. Player-specific information includes, but is not limited to, passwords, biometric identification, player card identification, and biographic data. Additionally, employee specification information may include biographic data, biometric information, job level and rank, passwords, authorization codes and security clearance levels.

Overall, the back end system 142 performs several functions. For example, the back end system 142 can collect data from the slot floor as communicated to it from other network components, and maintain the collected data in its database. The back end system 142 may use slot floor data to generate a report used in casino operation functions. Examples of such reports include, but are not limited to, accounting reports, security reports, and usage reports. The back end system 142 may also pass data to another server for other functions. Alternatively, the back end system 142 may pass data stored on its database to floor hardware for interaction with a game or game player. For example, data such as a game player's name or the amount of a ticket being redeemed at a game may be passed to the floor hardware. Additionally, the back end system 142 may comprise one or more data repositories for storing data. Examples of types of data stored in the system server data repositories include, but are not limited to, information relating to individual player play data, individual game accounting data, gaming machine accounting data, cashable ticket data, sound data, and optimal display configurations for one or more displays for one or more system games.

Of course, one will appreciate that a gaming system 140 may also comprise other types of components, and the above illustrations are meant only as examples and not as limitations to the types of components or games used in a casino gaming system.

Referring back to FIG. 1, the gaming machine 10 includes a plurality of player-activated buttons 20 used for various functions such as, but not limited to, selecting a wager denomination, selecting a number of games to be played, selecting the wager amount per game, initiating a game, or cashing out money from the gaming machine 10. In various embodiments, the player-activated buttons 20 functions are, but are not limited to, mechanical buttons, electromechanical buttons, touch screen buttons, or soft key buttons. According to one embodiment, the buttons 20 are backlit to indicate whether the button is active.

In another embodiment, the player-activated button is a universal button module that provides a dynamic button system adaptable for use with various games, as disclosed in U.S. application Ser. No. 11/106,212, entitled "Universal Button Module," filed Apr. 14, 2005 and U.S. application Ser. No. 11/223,364, entitled "Universal Button Module," filed Sep. 9, 2005, which are both hereby incorporated herein by reference. In other embodiments, other input devices, such as but not limited to, a touch pad, a track ball, a mouse, switches, and toggle switches, are included with the gaming machine to also accept player input.

In yet another embodiment, a cellular phone or other input devices (e.g., PDA), separate and apart, from the gaming machine 10 may also be used to input various player choices and information to enhance the player's interactive experience with the gaming machine. In this embodiment, the gaming machine 10 includes an IR sensor, an RF sensor, a BLUETOOTH receiver, or other means for receiving input from a cellular phone or other wireless input devices. Furthermore, inputting information via these devices provides an added level of security as any key presses may be hidden from view. In yet another embodiment, a player may call or send a text message or a short message service (SMS) to the gaming machine 10.

The main cabinet 14 of the gaming machine 10 is a self-standing unit that is generally rectangular in shape. In another embodiment, the main cabinet is a slant-top gaming cabinet. Alternatively, in other embodiments, the gaming cabinet may be any shaped cabinet known or developed in the art that may include a top box. Additionally, the cabinet may be manufactured with reinforced steel or other rigid materials that are resistant to tampering and vandalism. Optionally, in an alternate embodiment, the gaming machine is a cinema-style gaming machine (not shown) having a widescreen display, as disclosed in U.S. application Ser. No. 11/225,827, entitled "Ergonomic Gaming Cabinet," filed on Sep. 12, 2005, which is hereby incorporated herein by reference.

As shown in FIG. 1, the gaming machine 10 includes a top box 22 and a main cabinet 16. According to one embodiment, the top box 22 is a separate and distinct component that is affixed to the main cabinet 14. In another embodiment, the top box 22 is an area that is partitioned from the main cabinet 14. Alternatively, the top box 22 and the main cabinet 14 may be contiguous areas with the outward appearance of two distinct components. In another embodiment, the top box 22 also includes a display glass (not shown) that includes the name of the game, artwork, game instructions, pay table, or other information relating to one or more games presented on the gaming machine 10.

In another embodiment, the top box 18 includes a secondary display 24. The secondary display 24 presents game information (e.g., name of the game, animation, one or more pay tables, game information, one or more help menus, progressive jackpot or game information, tournament game information, or any combination thereof) or non-game related information (e.g., news, advertisements, messages, promotions, or any combination thereof). In another embodiment, the secondary display 24 presents a secondary game such as, but not limited to, a bonus game, a progressive game, or another game of chance such as, but not limited to, video slots, video keno, video poker, video blackjack, video roulette, Class II bingo, games of skill, games of chance involving some player skill, or any combination thereof.

In an alternative embodiment, the secondary display 24 presents game-related information such as, but not limited to, a pay table or one or more game options to the player. Alternately, the secondary display 24 presents non-game related information such as, but not limited to, advertisements, news, information on sports betting and betting options for those sporting events, requests for drinks or food, concierge services, or promotional information (e.g., information relating to a player's club).

Optionally, the gaming machine 10 also includes a third display 30 positioned above the curved material 12. As those skilled in the art will appreciate, the third display may be positioned below the main display, adjacent to the primary or secondary display, on the player interface, or any location on the gaming machine within the line-of-sight of a player. According to one embodiment, the third display 30 is a graphical interface, which is the subject of U.S. patent application Ser. No. 10/943,771, filed Sep. 16, 2004, which is hereby incorporated herein by reference.

The graphical interface includes a web content capable display screen and an embedded processor. Preferably, the web content capable display screen presents web information to a user via the display screen. The embedded processor preferably utilizes an internal operating system and communicates with the gaming processor of the gaming machine. Preferably, the embedded processor reads incoming data, translates the data into a web protocol (web authoring language), if necessary, and maps the data to the web content capable display screen. In this manner, the web content capable display screen increases user excitement by providing a richer gaming experience. Furthermore, the display allows the player to play a secondary game, input information, make selections, receive promotional information or other types of information including, but not limited to, notification that the player has won a system award and is entered into a tournament game or other bonus game. Additionally, the player is able to configure the attributes of interchanging display content via the graphical interface. In another embodiment, the content of the graphical interface may be presented on a portion of the main display 12 or as a pop-up window on the main display.

As shown in FIG. 1, the gaming machine 10 includes a player tracking system. The player tracking system allows a casino to monitor the gaming activities of various players. Additionally, the player tracking system is able to store data relating to a player's gaming habits. That is, a player can accrue player points that depend upon the amount and frequency of their wagers. Casinos can use these player points to compensate the loyal patronage of players. For example, casinos may award or "comp" a player free meals, room accommodations, tickets to shows, and invitations to casino events and promotional affairs. In one embodiment, the player's club level (e.g., Silver, Gold, Platinum), player rating, or total number of player points may qualify a player for a keno bonus round. In another embodiment, the player's club level adjusts the pay table for a keno game. Accordingly, a higher rated player wins more money for a given outcome as compared to a lower level (or unrated) player.

Typically, the player tracking system is operatively connected to one or more input components on the gaming machine 10. These input components include, but are not limited to, a slot 26 for receiving a player tracking card, a keypad or equivalent, an electronic button receptor, a display, a touch screen, or the like. The player tracking system may also include a database of all qualified players (i.e., those players who have enrolled in a player rating or point accruing program). Generally, the database for the player tracking system is separate from the gaming machines.

The main cabinet 14 of the gaming machine also houses a game management unit (not shown) that includes a CPU, circuitry, and software for receiving signals from the player-activated buttons 20, operating the games, and transmitting signals to the respective game display 12, 24 and speakers.

In various embodiments, the game program may be stored in a memory (not shown) comprising a read-only memory (ROM), volatile or non-volatile random access memory (RAM), a hard drive or flash memory device or any of several alternative types of single or multiple memory devices or structures. Optionally, the gaming machines 10 include one or more data repositories for storing data. Examples of information stored by the gaming machines 10 include, but are not limited to, accounting data, maintenance history information, short and/or long-term play data, real-time play data, sound data, video data, or animation data.

As shown in FIG. 1, the gaming machine 10 includes a ticket reader/ticket printer slot 36 that is associated with a cashless gaming system (not shown). According to one embodiment, the slot 36 is used for the ticket reader and ticket printer. Accordingly, the same slot 36 may be used to insert and/or issue a ticket. However, in alternate embodiments, separate slots (not shown) may be provided for the ticket acceptor and the ticket printer. In one embodiment, the ticket reader (not shown) of the cashless gaming system is capable of accepting previously printed vouchers, paper currency, promotional coupons, or the like. The ticket printer (not shown) of the cashless gaming system generates vouchers having printed information that includes, but is not limited to, the value of the voucher (i.e., cash-out amount) and a barcode that identifies the voucher.

In another embodiment, the gaming machine 10 includes an internet connection or other known network connections to link one or more gaming machines together. According to one embodiment, the internet connection is used for web browsing, prize redemption, or access to other gaming or non-gaming information. Additionally, with the various gaming machines in communication with one another (or a system host), the gaming machine 10 may participate in a gaming tournament. In one embodiment, the gaming tournament is a competitive gaming tournament having one or more winners. Alternatively, the gaming tournament is a cooperative gaming tournament where all eligible gaming machines win a particular award.

One of ordinary skill in the art will appreciate that not all gaming machines have all these components and may have other components in addition to, or in lieu of, those components mentioned here. Furthermore, while these components are viewed and described separately, various components may be integrated into a single unit in some embodiments.

The various embodiments and methods described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A gaming machine comprising:

a curved material having an outer surface, an inner surface, and a radius of curvature similar to a mechanical reel;

a flat liquid crystal display having an opening and positioned around the perimeter of the curved transparent material, wherein the curved material extends through the opening of the liquid crystal display, and a video image presentation of one or more reels presented onto the inner surface of the curved transparent material, the video image presentation presenting game information onto the flat transparent material.

2. The gaming machine of claim 1, further comprising a touch screen, the touch screen producing touch data when activated.

3. The gaming machine of claim 2, wherein the touch screen is in communication with a touch screen system including a touch panel controller for controlling and interpreting touch data, and touch panel software for controlling and interpreting touch data.

4. The gaming machine of claim 2 wherein the liquid crystal display presents player controls which may be operated via the touchscreen.

5. The gaming machine of claim 4, wherein the player controls comprise buttons.

6. The gaming machine of claim 1 wherein the liquid crystal display presents gaming information.

7. The gaming machine of claim 6, wherein the gaming information comprises credit information.

8. The gaming machine of claim 1 wherein the liquid crystal display presents non-gaming information.

9. The gaming machine of claim 8, wherein the non-gaming information comprises player-tracking information.

* * * * *